United States Patent
Oguchi

(10) Patent No.: US 8,750,244 B2
(45) Date of Patent: Jun. 10, 2014

(54) WIRELESS TERMINAL, WIRELESS BASE STATION AND COMMUNICATION METHOD IN WIRELESS COMMUNICATION SYSTEM

(75) Inventor: Naoki Oguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 317 days.

(21) Appl. No.: 12/879,268

(22) Filed: Sep. 10, 2010

(65) Prior Publication Data

US 2011/0064048 A1 Mar. 17, 2011

(30) Foreign Application Priority Data

Sep. 15, 2009 (JP) ................................. 2009-212967

(51) Int. Cl.
*H04W 4/00* (2009.01)
(52) U.S. Cl.
USPC .......................................................... 370/331
(58) Field of Classification Search
USPC ........... 370/331, 329; 455/434, 436, 432, 458
See application file for complete search history.

(56) References Cited

U.S. PATENT DOCUMENTS

| | | | |
|---|---|---|---|
| 7,158,503 B1 * | 1/2007 | Kalliojarvi et al. ........... | 370/347 |
| 7,580,397 B2 | 8/2009 | Arai et al. | |
| 2002/0132621 A1 | 9/2002 | Takano et al. | |
| 2006/0014537 A1 | 1/2006 | Arai et al. | |
| 2007/0270118 A1 * | 11/2007 | Subramanian et al. .... | 455/343.2 |
| 2008/0232272 A1 * | 9/2008 | Gelbman et al. .............. | 370/254 |
| 2009/0042567 A1 * | 2/2009 | Lim et al. ....................... | 455/434 |
| 2009/0213795 A1 | 8/2009 | Barber et al. | |
| 2009/0290555 A1 * | 11/2009 | Alpert et al. .................. | 370/331 |
| 2009/0323603 A1 * | 12/2009 | Kwon et al. ................... | 370/329 |
| 2010/0067448 A1 * | 3/2010 | Chin et al. ..................... | 370/329 |
| 2010/0087205 A1 * | 4/2010 | Kong ........................... | 455/456.1 |
| 2010/0254323 A1 * | 10/2010 | Youn et al. ..................... | 370/329 |
| 2012/0020325 A1 * | 1/2012 | Swamy et al. ................. | 370/331 |

FOREIGN PATENT DOCUMENTS

| | | |
|---|---|---|
| JP | 2002-271264 | 9/2002 |
| JP | 2004-147314 | 5/2004 |
| JP | 2006-13594 | 1/2006 |
| JP | 2006-254093 | 9/2006 |
| WO | 2005/011152 | 2/2005 |
| WO | 2008/140202 | 11/2008 |

OTHER PUBLICATIONS

European Search Report dated Dec. 14, 2010, from the corresponding European Application.
"IEEE Std. 802.16, Part 16: Air Interface for Fixed Broadband Wireless Access Systems" IEEE Computer Society and the IEEE Microwave Theory and Techniques Society, Oct. 1, 2004.

(Continued)

*Primary Examiner* — Chi Pham
*Assistant Examiner* — Fahmida Chowdhury
(74) *Attorney, Agent, or Firm* — Katten Muchin Rosenman LLP

(57) ABSTRACT

In a wireless communication system, time point information is transmitted from a second wireless base station. The time point information indicates a time point at which service information is transmitted from the second wireless base station. Moreover, at the time point indicated by the time point information, the service information is transmitted from the second wireless base station. On the wireless terminal side, firstly, the time point information is obtained in a first non-communication period in which communication with the first wireless base station is temporarily stopped. Then, the service information is obtained in a second non-communication period which is ensured in accordance with the time point indicated by the time point information.

14 Claims, 12 Drawing Sheets

(56) References Cited

OTHER PUBLICATIONS

"IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.

Notification of Reason(s) for Rejection dated Nov. 22, 2012, from corresponding Japanese Application No. 2009-212967.

Taiwanese Office Action dated May 1, 2013, from corresponding Taiwanese Application No. 099130641.

* cited by examiner

| Syntax | Size (bit) |
|---|---|
| SII-ADV(){ | – |
| Management message type = 68 | 8 |
| TLV type = 133 | 8 |
| Length | 8 |
| NSP ID(1) | 24 |
| . . . | . . . |
| NSP ID(n) | 24 |
| TLV type = 132 | 8 |
| Verbose NSP Name Length(1) | 8 |
| Verbose NSP Name(1) | 8 × L1 |
| . . . | . . . |
| Verbose NSP Name Length(n) | 8 |
| Verbose NSP Name(n) | 8 × Ln |
| } | – |

| Discovery NSP | NSP ID (24bits) | Discovery NAP | NAP ID (24bits) |
|---|---|---|---|
| AAAA (NSP#3) | 0x000510 | aaaa (NAP#3) | 0xE0D111 |
| BBBB (NSP#2) | 0x000AC0 | bbbb (NAP#2) | 0xA3CD38 |

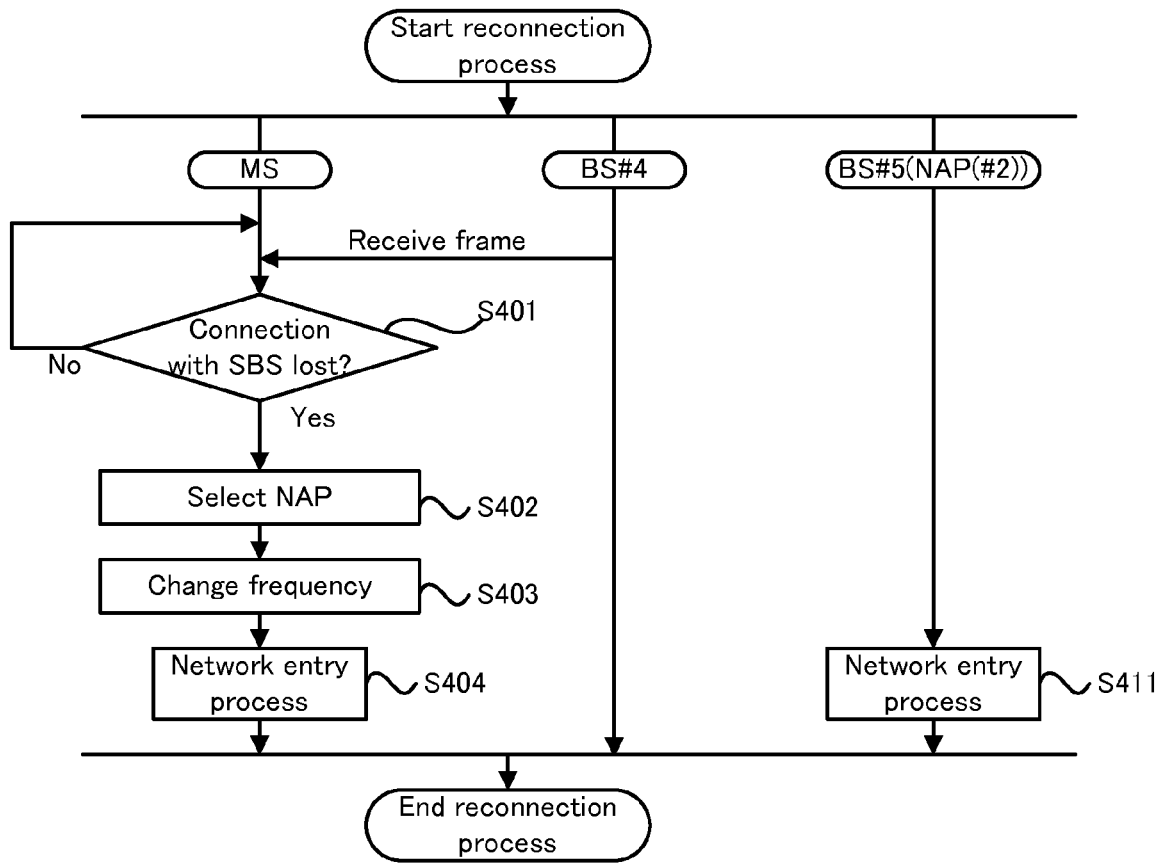

WIRELESS TERMINAL, WIRELESS BASE STATION AND COMMUNICATION METHOD IN WIRELESS COMMUNICATION SYSTEM

CROSS-REFERENCE TO RELATED APPLICATIONS

This application is based upon and claims the benefit of priority of the prior Japanese Patent Application No. 2009-212967, file on Sep. 15, 2009, the entire contents of which are incorporated herein by reference.

FIELD

A certain aspect of the embodiment discussed herein relates to a wireless terminal which performs wireless communication with a wireless base stations; a wireless base station which performs wireless communication with the wireless terminal, and a communication method in a wireless communication system which includes the wireless terminal and the wireless base station.

BACKGROUND

In the wireless communication system, a plurality of wireless base stations are located, and the wireless communication is performed between the wireless terminal and the wireless base stations. Thus, the wireless terminal transmits and receives various information via the wireless base stations. Due to limitation of size of the communication area of each wireless base station, if the wireless terminal moves out of the communication area of a certain wireless base station, the wireless communication of the wireless terminal may be lost. A handover technique is conventionally proposed, in order not to lose the wireless communication in such a case. By the handover technique, the connection between the wireless terminal and a source wireless base station is taken over by a destination wireless base station, when the wireless terminal enters into the communication area of the destination wireless base station. Thus, the wireless terminal can keep performing the wireless communication. By this, it is possible to realize the wireless communication that is highly reliable, without losing the wireless communication between the wireless terminal and the wireless base station(s).

On the other hand, one possible configuration example of the wireless communication system includes, for example, a network access provider (NAP) for providing a wireless access network including a plurality of wireless base stations as one group; and a network service provider (NSP) for actually providing a service (in other words, application) to the wireless terminal via the network access provider. As the system employing such a configuration, a wireless communication system that conforms to IEEE802.16 method is listed.

Patent document 1: International Publication Pamphlet No. 2005/011152
Patent document 2: Japanese Patent No. 3543773
Patent document 3: Japanese Laid Open Patent Publication No. 2006-254093
Patent document 4: Japanese Laid Open Patent Publication No. 2006-13594
Non-Patent document 1: IEEE802.16-2004
Non-Patent document 2: IEEE802.16e-2005

SUMMARY

In such a wireless communication system, there can be a plurality of network access providers and a plurality of network service providers. In this case, the wireless terminal preferably selects the network access provider via which the wireless terminal performs the wireless communication and selects the network service provider from which the wireless terminal receives a service. Thus, the wireless terminal preferably searches for a network access provider which can performs wireless communication with the wireless terminal and a network service provider which can provide a service via the network access provider, as one portion of an initial sequence upon initial connection or reconnection after moving out of the communication area. Moreover, the wireless terminal preferably establishes a connection with the searched network access provider, as another portion of the initial sequence.

On the other hand, once the wireless terminal establishes the connection with the network access provider, the wireless terminal can maintain the wireless communication, by performing the handover, as occasion demands, with each of the plurality of base stations provided for the network access provider with which the connection is established. However, if there is no wireless base station that allows the handover in the wireless access network provided by the network access provider with which the connection is currently established, then, the wireless terminal preferably establishes a new connection (in other words, change the connection destination) to another network access provider.

Therefore, if there is no wireless base station that allows the handover, the wireless terminal preferably performs the initial sequence again to search for another network access provider and another network service provider that can perform the wireless communication. In other words, the wireless terminal preferably performs the initial sequence again with another network access provider after the loss of the connection with the network access provider with which the connection is currently established. Thus, there may be such a technical problem that a time between the loss of the connection with the network access provider with which the connection is currently established and the establishment of a connection with another network access provider could be longer. If one uses a service which requires a real-time communication like e.g. VoIP, the service may not be able to be continuously used (i.e. the connection of the service could be lost).

According to an aspect of the embodiment, a wireless terminal includes a first obtaining device and a second obtaining device. The first obtaining device obtains time point information in a first non-communication period in which communication with a first wireless base station which belongs to a first base station group is temporarily stopped. In other words, the first obtaining device obtains the time point information in the first non-communication period in which the communication is temporarily stopped while a connection with the first wireless base station is maintained. The time point information indicates a time point at which service information is transmitted from the second wireless base station. The service information directly or indirectly indicates a service provided via the second wireless base station which belongs to a second base station group which is different from the first base station group. Thus, the time point information is preferably transmitted from the second wireless base station which actually transmits the service information. The second obtaining device obtains the service information in a second non-communication period which is ensured in accordance with the time point indicated by the time point information (in other words, in synchronization with or simultaneously with the time point indicated by the time point information).

Since the service information is obtained in the second non-communication period which is ensured in accordance with the time point indicated by the time point information, it is possible to relatively reduce the second non-communication period required to obtain the service information, in comparison with a wireless terminal that obtains the service information without obtaining the time point information. Therefore, in comparison with the wireless terminal that obtains the service information without obtaining the time point information, it is possible to properly obtain the service information while reducing the second non-communication period which is ensured to obtain the service information.

In addition, the time point information and the service information described above are obtained after the communication is temporarily stopped while the connection with the first wireless base station is maintained. Thus, even if the connection between the wireless terminal and the first wireless base station is lost, it is possible to establish a connection with the second wireless base station which can receive a desired service, with reference to the service information already obtained before the loss of the connection. By this, in comparison with a wireless terminal that obtains the service information after the loss of the connection with the first wireless base station and then establishes a connection with the second wireless base station, it is possible to reduce a time required to establish a connection with second wireless base station after the loss of the connection with the first wireless base station.

Moreover, since the service information is transmitted at the time point indicated by the time point information transmitted before the service information, it is possible to relatively reduce a time required for the wireless terminal to obtain the service information, in comparison with a wireless base station that does not transmit the time point information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 14 is data structure diagram illustrating the data structure of the SII-ADV message included in a DL sub frame in the frame;

FIG. 15 is a table illustrating a discovery NAP/NSP list;

FIG. 16 is a flowchart illustrating a flow of a reconnection process; and

FIGS. 17A and 17B are tables each illustrating a preferred NAP/NSP list.

DESCRIPTION OF EMBODIMENT

Hereinafter, the embodiments will be explained with reference to the drawings.

(1) First Embodiment

Figure 1:
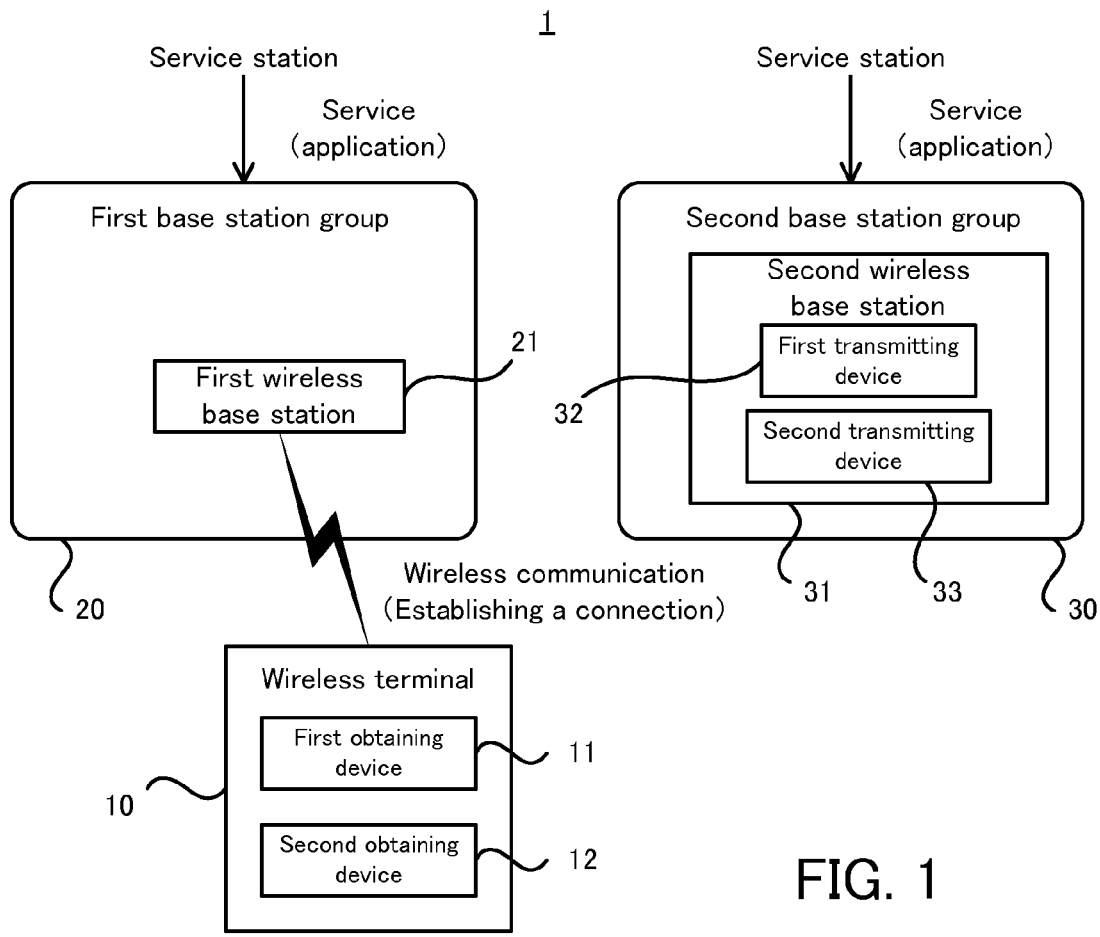
FIG. 1 is a configuration diagram illustrating the structure of a wireless communication system of a first embodiment.
Figure 2:
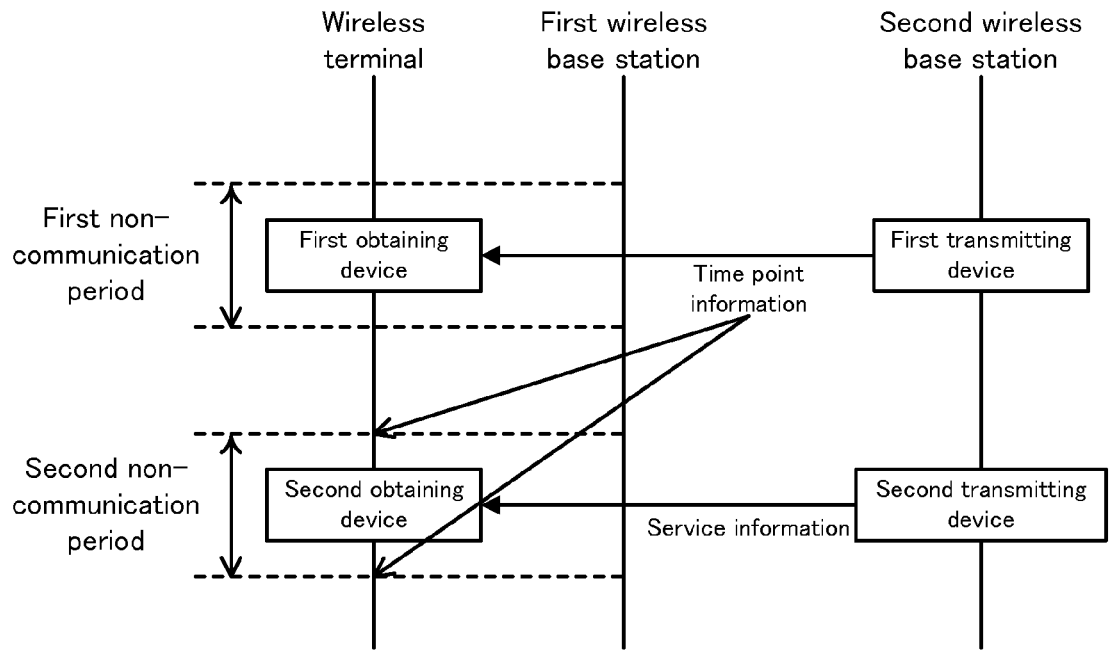
FIG. 2 is a sequence diagram illustrating operations in the wireless communication system of the first embodiment.

With reference to FIG. 1 and FIG. 2, a wireless communication system of a first embodiment will be explained. FIG. 1 is a block diagram illustrating the structure of the wireless communication system of the first embodiment. FIG. 2 is a sequence diagram illustrating operations in the wireless communication system of the first embodiment.

As illustrated in FIG. 1, a wireless communication system 1 of the first embodiment includes a wireless terminal 10; a first base station group 20 including a first wireless base station 21; and a second base station group 30 including a second wireless base station 31.

Each of the first wireless base station 21 and the second wireless base station 31 performs wireless communication with the wireless terminal 10. The first wireless base station 21 preferably functions as a relay station for the wireless terminal 10 to use a service (in other words, application) provided from a service station connected to the first base station group 20 via a wired or wireless network. The second wireless base station 31 preferably functions as a relay station for the wireless terminal 10 to use a service (in other words, application) provided from a service station connected to the second base station group 30 via a wired or wireless network. Incidentally, FIG. 1 explains an example in which the wireless terminal 10 performs the wireless communication (in other words, establishes a connection) with the first wireless base station 21.

The second wireless base station 31 includes a first transmitting device 32 and a second transmitting device 33. The first transmitting device 32, as illustrated in FIG. 2, transmits time point information to the wireless terminal 10. The time point information indicates a time point at which service information is transmitted. The service information indicates the service provided via the second wireless base station 31 (in other words, the second base station group 30). The service information may be information directly indicating the service provided via the second wireless base station 31. Alternatively, the service information may be information indirectly indicating the service provided via the second wireless base station 31 (e.g. information indicating the service station that provides the service, information indicating the type, attribute, or the like of the service, and the like). The second transmitting device 33, as illustrated in FIG. 2, transmits the service information to the wireless terminal 10 at the time point indicated by the time point information.

The wireless terminal 10 includes a first obtaining device 11 and a second obtaining device 12. The first obtaining device 11, as illustrated in FIG. 2, obtains the time point information in a first non-communication period in which the wireless communication with the first wireless base station 21 is temporarily stopped. In other words, the first obtaining device 11 obtains the time point information in the first non-communication period in which the wireless communication is temporarily stopped while the connection with the first wireless base station 21 is maintained. The second obtaining device 12, as illustrated in FIG. 2, actually obtains the service information in a second non-communication period in which the wireless communication with the first wireless base station 21 is temporarily stopped. The second non-communication period is ensured in accordance with the time point indicated by the time point information (i.e. the time point at which the service information is transmitted).

According to the wireless communication system 1 of the first embodiment, the wireless terminal 10 obtains the time point information before obtaining the service information. Thus, in comparison with a wireless terminal that obtains the service information without obtaining the time point information, it is possible to relatively reduce the second non-communication period, which is ensured for the wireless terminal 10 to obtain the service information. By this, in comparison with the wireless terminal that obtains the service information without obtaining the time point information, it is possible to properly obtain the service information while relatively reducing the period in which the communication between the wireless terminal 10 and the first wireless base station 21 is stopped in order to obtain the service information.

Moreover, the wireless terminal 10 can directly or indirectly recognize the service provided via the second wireless base station 31 while maintaining the connection with the first wireless base station 21. If the connection between the wireless terminal 10 and the first wireless base station 21 is lost, it is possible to quickly establish a connection with the second wireless base station 31 from which the wireless terminal 10 can receive a desired service (or, for example, which can access the service station that provides the desired service), with reference to the service information that has been already obtained. By this, in comparison with a wireless terminal that obtains the service information after the connection with the first wireless base station 21 is lost and then establishes a connection with the second base station 31, it is possible to reduce a time required to establish the connection between the second wireless base station 31 and the wireless terminal 10 after the loss of the connection between the first wireless base station 21 and the wireless terminal 10.

(2) Second Embodiment

Next, a wireless communication system in a second embodiment will be explained.

(2-1) Structure of Wireless Communication System in Second Embodiment

Figure 3:
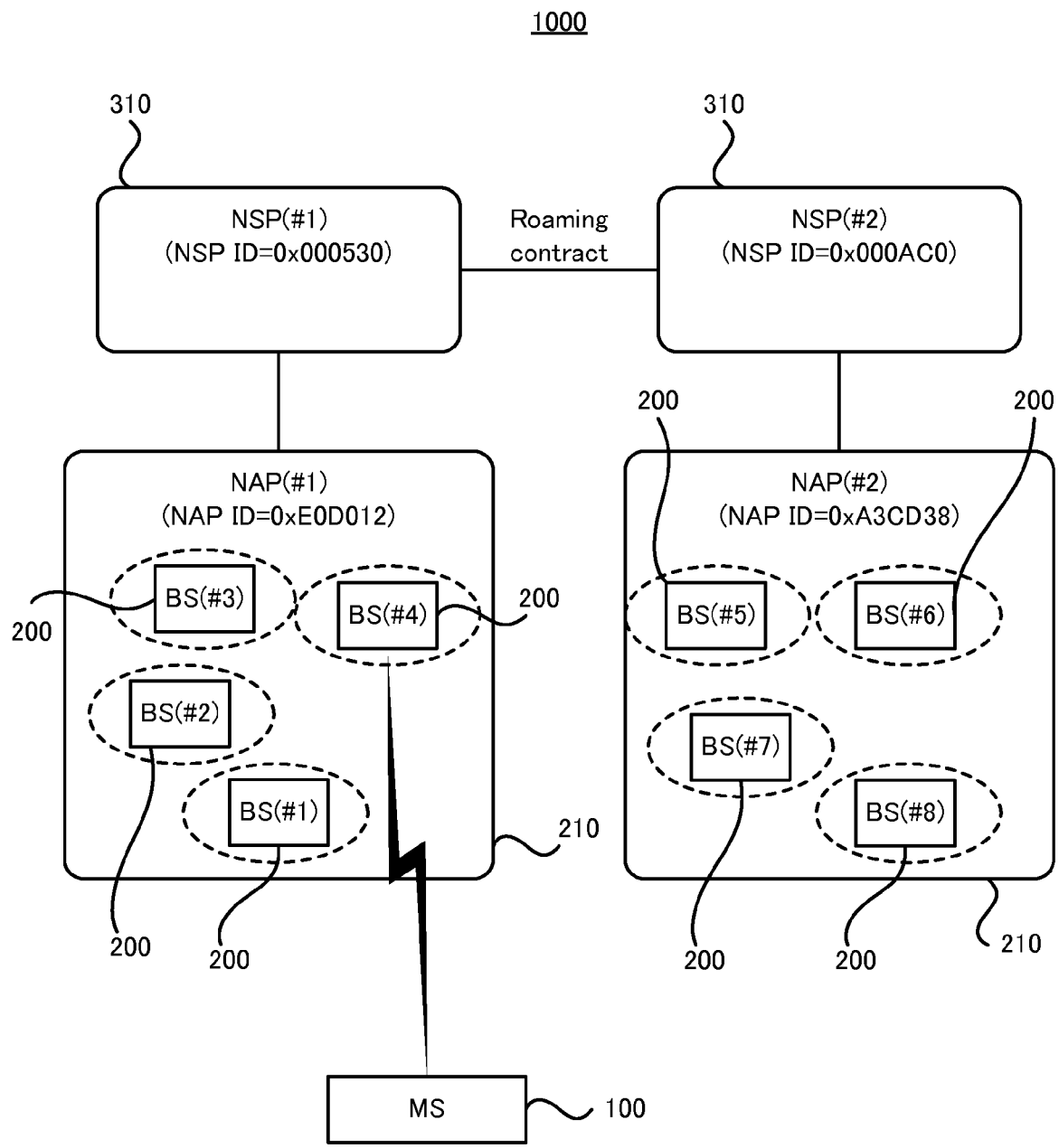
FIG. 3 is a configuration diagram illustrating the structure of a wireless communication system of a second embodiment.

With reference to FIG. 3, an explanation will be given on the wireless communication system 1000 of the second embodiment. FIG. 3 is a configuration diagram illustrating the structure of the wireless communication system 1000 of the second embodiment.

As illustrated in FIG. 3, the wireless communication system 1000 of the second embodiment includes a MS (Mobile Station: mobile terminal) 100, an NAP (Network Access Provider)(#1) 210, an NAP(#2) 210, an NSP (Network Service Provider)(#1) 310, and an NSP(#2) 310.

Incidentally, in the second embodiment, the following explanation will be given on the wireless communication system 1000 which is a IEEE802.16 system. However, not only the IEEE802.16 system but also another wireless communication system (e.g. IMT-2000 system or the like) may also employ the configuration and operations to be explained below, in consideration of a specification of the wireless communication system.

Each of the NAP(#1) 210 and the NAP(#2) 210 is, for example, a communication carrier that provides a wireless access network. To each of the NAP(#1) 210 and the NAP(#2) 210, an NAP ID, which is a unique identification number, is preferably added. FIG. 3 illustrates an example in which the NAP ID of the NAP(#1) 210 is "0xE0D012" and the NAP ID of the NAP(#2) 210 is "0xA3CD38".

Moreover, each of the NAP(#1) 210 and the NAP(#2) 210 includes a plurality of BSs (Base Station: wireless base station) 200 in the wireless access network. Each BS 200 establishes a connection with the MS 100 located in a cell corresponding to the each BS 200 (see a dashed line in FIG. 3) and actually performs wireless communication. FIG. 3 illustrates an example in which a BS(#1) 200, a BS(#2) 200, a BS(#3) 200, and a BS(#4) 200 are included in the wireless access network of the NAP(#1) 210. FIG. 3 illustrates an example in which a BS(#5) 200, a BS(#6) 200, a BS(#7) 200, and a BS(#8) 200 are included in the wireless access network of the NAP(#2) 210. Moreover, a BS ID, which is a unique identification number, is preferably added to each BS 200.

Each of the NSP(#1) 310 and the NSP(#2) 310 is a service provider, such as an Internet provider. Each of the NSP(#1) 310 and the NSP(#2) 310 provides the service or the application (e.g. an e-mail service, a voice communication service, a WEB browsing service, etc.) to the MS 100 via the NAP(#1) 210 or the NAP(#2) 210. To each of the NSP(#1) 310 and the NSP(#2) 310, an NSP ID, which is a unique identification number, is preferably added. FIG. 3 illustrates an example in which the NSP ID of the NSP(#1) 310 is "0x000530" and the NSP ID of the NSP(#2) 310 is "0x000AC0".

The MS 100 establishes the connection with the BS 200 corresponding to the cell in which the MS 100 is located and also performs the wireless communication. The MS 100 receives the service from the NSP(#1) 310 or the NSP(#2) 310 via the BS 200 (in other words, the wireless access network to which the BS 200 belongs, or the NAP(#1) 210 or the NAP(#2) 210 for providing the wireless access network). As the MS 100, for example, a mobile phone, a PDA (Personal Digital Assistant), and other various information equipment having wireless communication functions are listed as one example.

In the wireless communication system 1000 of the second embodiment, the wireless communication is performed between the MS 100 and the BS 200, for example, by transmitting and receiving a frame in a communication system conforming to IEEE802.16. Therefore, in the wireless communication system 1000 of the second embodiment, the wireless communication is performed by transmitting and receiving the frame of a predetermined format in an OFDM (Orthogonal Frequency Division Multiplexing Access) method which uses a plurality of subcarriers, or in an OFDMA (Orthogonal Frequency Division Multiple Access) method which uses a sub-channel which is a combinations of a symbol and a logical channel on a frequency axis in which the sub carrier is divided.

Figure 4:
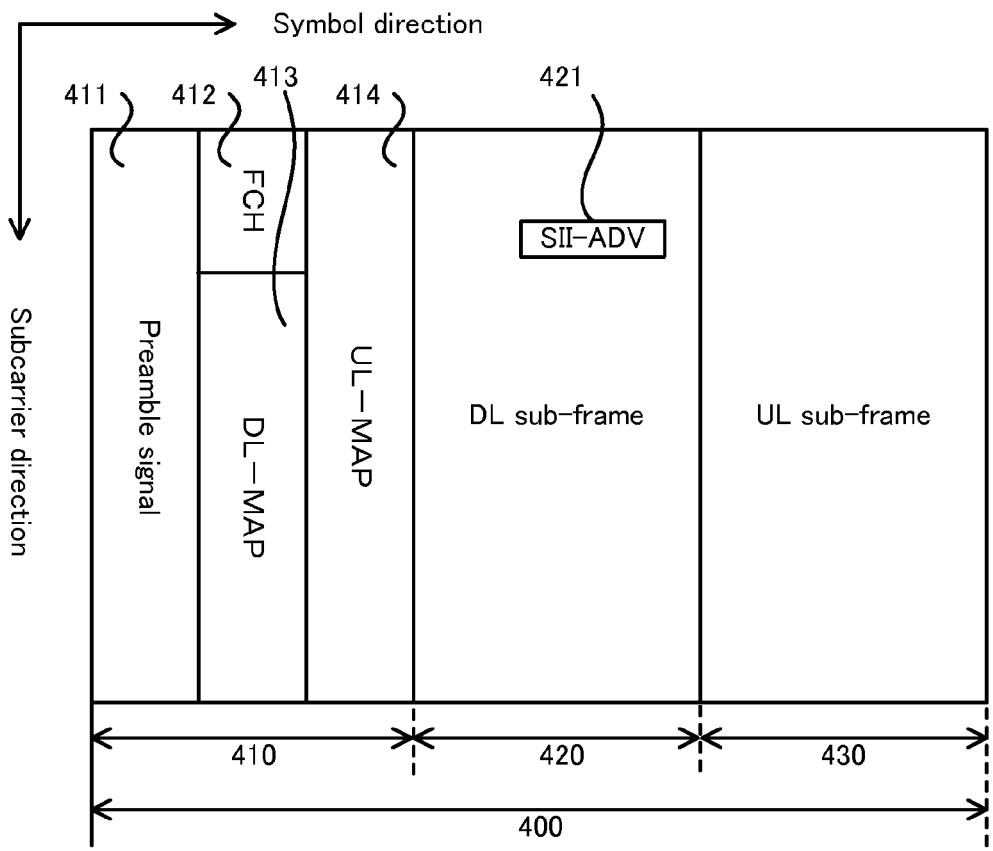
FIG. 4 is a data structure diagram illustrating the structure of a frame in IEEE802.16.

With reference to FIG. 4, the structure of the frame in IEEE802.16 will be explained. FIG. 4 is a data structure diagram illustrating the structure of the frame in IEEE802.16.

As illustrated in FIG. 4, a frame 400 is formed by a unit of OFDM frame (or OFDMA frame) specified by a subcarrier (i.e. frequency) and a symbol (i.e. time). The frame 400 includes a header portion 410 including control information, a DL (Down Link) sub-frame portion 420, and a UL (Up Link) sub-frame portion 430.

The header portion 410 includes a preamble signal 411, a FCH (Frame Control Header) 412, a DL-MAP (Down Link Mapping message: Down Link Mapping information) 413, and an UL-MAP (Up Link Mapping message: Up Link Mapping information) 414.

The preamble signal 411 is a signal used by the MS 100 to establish synchronization with the BS 200 or to measure quality of the frame 400 transmitted from the BS 200.

The FCH 412 is information to be transmitted in order to inform the terminal of the modulation method, coding method and the like of the DL-MAP 413 and the UL-MAP 414 such that the MS 100 can accurately read the subsequent control information, such as the DL-MAP 413 and the UL-MAP 414.

The DL-MAP 413 and the UL-MAP 414 are control information indicating the positions of various data included in the DL sub-frame portion 420 and the UL sub-frame portion 430. For example, if various data is included by a unit of burst in the DL sub-frame portion 420 and the UL sub-frame portion 430, the DL-MAP 413 and the UL-MAP 414 include control information indicating the position of the burst (i.e. burst profile information). The DL-MAP 413 includes the BS ID of the BS 200 which transmits the frame 400 and the NAP ID of the NAP 210 to which the BS 200 transmitting the frame 400 belongs.

The DL sub-frame portion 420 includes data to be transmitted from the BS 200 to the MS 100. The DL sub-frame portion 420 includes a SII-ADV (Service Identity Information) message 421, which indicates the NSP ID of the NSP 310 which provides the service via the BS 200 which transmits the frame 400, in each predetermined period (e.g. at intervals of predetermined seconds or at intervals of predetermined frames). The SII-ADV message 421 could be one specific example of the aforementioned "service information". The UL sub-frame portion 430 includes data to be transmitted from the MS 100 to the BS 200.

Incidentally, in the second embodiment, for convenience of explanation, an explanation will be proceeded under the assumption that the MS 100 receives the service provided by the NSP(#1) 310 via the NAP(#1) 210 and receives the service provided by the NSP(#2) 310 via the NAP(#2) 210. Moreover, the MS 100 preferably receives the service provided from the NSP 310 with which a contract is made for service use. Thus, in the second embodiment, for convenience of explanation, an explanation will be proceeded under the assumption that the NSP(#1) 310 is the NSP 310 with which a contract is made for service use. Therefore, the MS 100 in the second embodiment receives the service provided by the NSP(#1) 310 by performing wireless communication via the BS 200 in the NAP(#1) 210, as a normal use aspect.

Moreover, in the second embodiment, an explanation will be proceeded under the assumption that the NSP(#1) 310 and the NSP(#2) 310 make a roaming contract. In other words, an explanation will be proceeded under the assumption that even if the MS 100 is located out of the wireless access network provided by the NAP(#1) 210, the MS 100 can receive the service provided by the NSP(#1) 310 via the NSP(#2) 310 by performing the wireless communication via the BS 200 in the NAP(#2) 210.

For simplification of explanation, FIG. 3 illustrates an example in which the NAP(#1) 210, the NAP(#2) 210, the NSP(#1) 310, and the NSP(#2) 310 are included; however, another NAP 210 and another NSP 310 may be further included.

(2-2) Structure of BS (Base Station: Wireless Base Station)
With reference to FIG. 5, the structure of the BS 200 will be explained.

Figure 5:
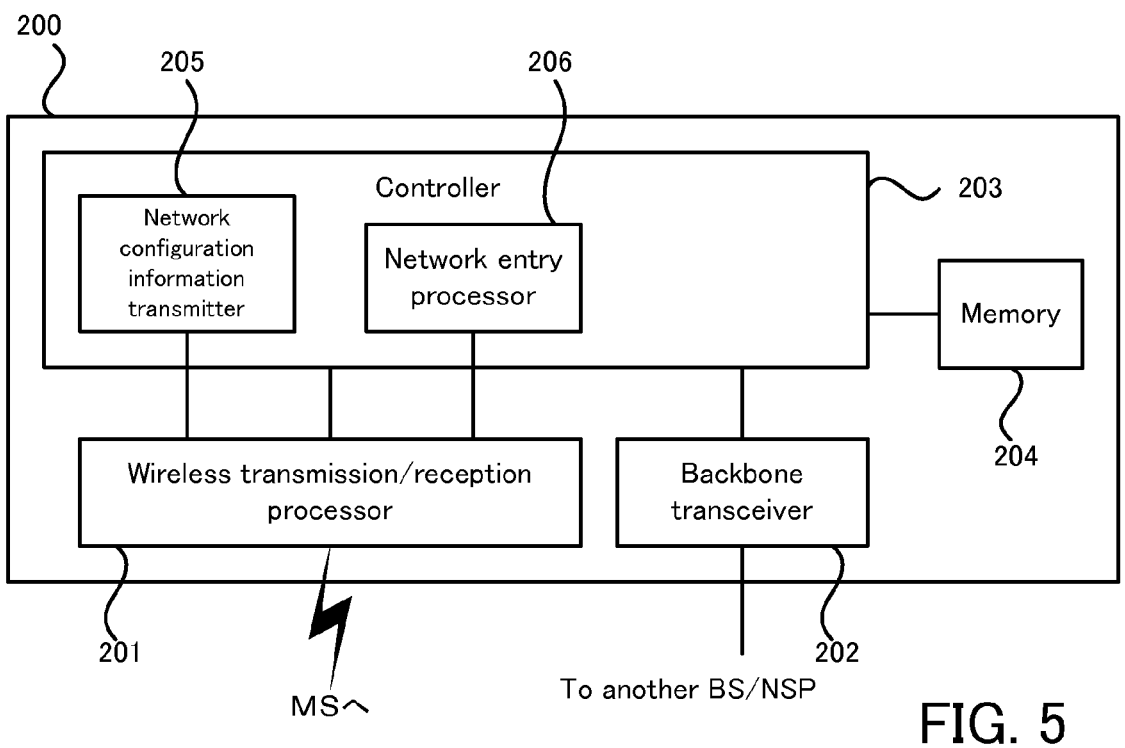
FIG. 5 is a block diagram illustrating the structure of a BS.

FIG. 5 is a block diagram illustrating the structure of the BS 200.

As illustrated in FIG. 5, the BS 200 includes a wireless transmission/reception processor 201, a backbone transceiver 202, a controller 203, and a memory 204.

The wireless transmission/reception processor 201 transmits the frame 400 including data generated on the controller 203 or the like, to the MS 100. The wireless transmission/reception processor 201 receives the frame 400 transmitted from the MS 100. Thus, the wireless transmission/reception processor 201 includes, for example, a baseband processing circuit for performing a baseband process including a data coding process (e.g. error correction coding for a convolutional code, a turbo code, or the like), a data decoding process, a process of generating the frame 400, and the like; a modulation circuit for performing QPSK modulation or 16QAM modulation; a demodulation circuit for performing a demodulation process; a RF circuit for adjusting a transmitted power or received power; an antenna for transmitting or receiving an radio wave; and the like.

The backbone transceiver 202 transmits and receives data with another BS 200 via a not-illustrated wired or wireless network. The backbone transceiver 202 transmits and receives data about the services provided by the NSP(#1) 310 and the NSP(#2) 310 via the not-illustrated wired or wireless network (moreover, not only the network but also another BS 200).

The controller 203 controls the entire operation of the BS 200. As the controller 203, for example, a CPU (Central Processor Unit) or the like which operates on the basis of predetermined firmware is listed as one example.

The controller 203 includes a network configuration information transmitter 205 and a network entry processor 206, as a logical or functional processing block formed in the controller 203. Such a processing block may be realized as the operation of a partial program of the firmware for defining the operation of the controller 203, or may be realized as the operation of a program independent of the firmware. Alternatively, the network configuration information transmitter 205 and a network entry processor 206 may be also realized as one circuit independent of the controller 203.

The network configuration information transmitter 205 generates timing information (e.g. a B.C.Pointer (Broadcast Control Pointer) message described later) indicating timing at which the SII-ADV message 421 is transmitted from the BS 200. This timing information could be one specific example of the aforementioned "time point information". The network configuration information transmitter 205 controls the wireless transmission/reception processor 201 such that the generated timing information is included in the frame 400, which is transmitted from the wireless transmission/reception processor 201 to the MS 100.

The network entry processor 206 performs an initial connection process (for example, a network entry process of the initial connection process) to establish a connection with the MS 100 and the BS 200. Thus, the network entry processor 206 receives a message (or data or frame) for the initial connection process which is transmitted from the MS 100, in accordance with the predetermined protocol via the wireless transmission/reception processor 201. The network entry processor 206 transmits a message for the initial connection process to the MS 100, in accordance with a predetermined protocol via the wireless transmission/reception processor 201. Moreover, the network entry processor 206 may also transmit and receive the message with the MS 100, regularly or irregularly, after the initial connection process is ended, in order to judge whether or not the MS 100 is located in the cell corresponding to the BS 200.

The memory 204 includes a memory area for temporarily storing data to be used within the BS 200. The memory 204 may include a memory area or the like in which a program (i.e. firmware) for performing the operation as the BS 200 is stored. As the memory 204, a semiconductor memory, such as RAM (Random Access Memory), and other various recording media are listed as one example.

(2-3) Structure of MS (Mobile Station: Mobile Terminal)

Figure 6:
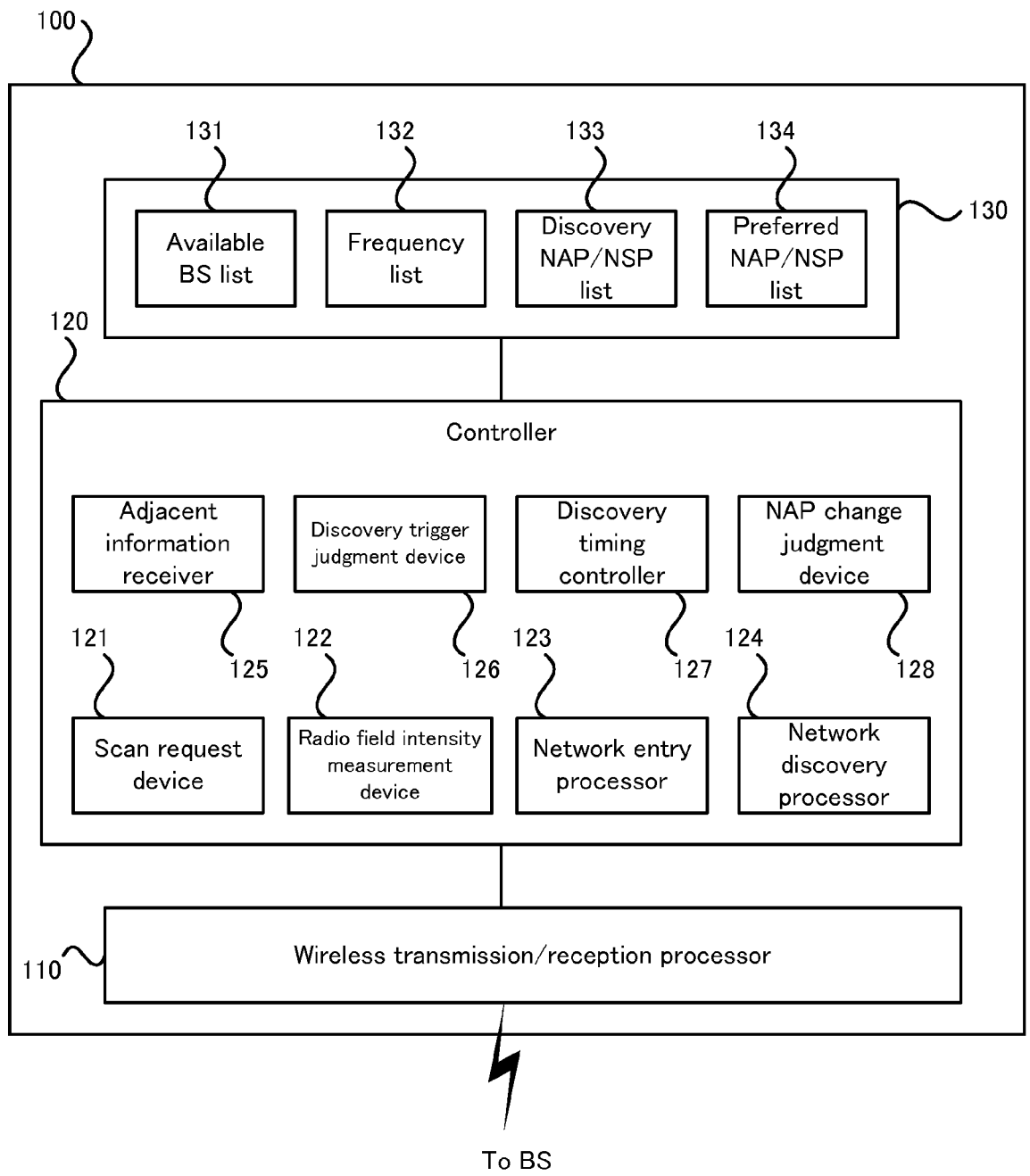
FIG. 6 is a block diagram illustrating the structure of a MS.

Next, with reference to FIG. 6, the structure of the MS 100 will be explained. FIG. 6 is a block diagram illustrating the structure of the MS 100.

As illustrated in FIG. 6, the MS 100 includes a wireless transmission/reception processor 110, a controller 120, and a memory 130.

The wireless transmission/reception processor 110 has the same structure as the aforementioned wireless transmission/reception processor 201. The wireless transmission/reception processor 110 transmits the frame including data generated on the controller 120 or the like, and receives the frame transmitted from the BS 200. Thus, the wireless transmission/reception processor 110 includes, for example, a baseband processing circuit, a modulation circuit, a demodulation circuit, a RF circuit, an antenna, and the like, as in the aforementioned wireless transmission/reception processor 201.

The controller 120 controls the entire operation of the MS 100. As the controller 120, a CPU or the like which operates on the basis of predetermined firmware is listed as one example.

The controller 120 includes a scan request device 121, a radio field intensity measurement device 122, a network entry processor 123, a network discovery processor 124, an adjacent information receiver 125, a discovery trigger judgment device 126, a discovery timing controller 127, and an NAP change judgment device 128, as a logical or functional processing block formed in the controller 120.

The scan request device 121 transmits a scan request message for requesting a stop of the transmission/reception of the data in a predetermined period, to the BS 200 with which the MS 100 currently establishes a connection and performs wireless communication (hereinafter such a BS 200 is referred to as a "SBS (Servicing BS) 200"), via the wireless transmission/reception processor 110. This scan request message is transmitted, for example, in performing a scan process of measuring the radio field intensity of another BS 200 other than the SBS 200. The scan request device 121 receives a response message from the SBS 200 with respect to the scan request message.

The radio field intensity measurement device 122 measures the radio field intensity of the BS 200 (e.g. a CINR (Carrier to Interference-plus-Noise Ratio, signal intensity of a RF signal, or the like), on the basis of the frame 400 from the BS 200 received by the wireless transmission/reception processor 110.

The network entry processor 123 performs the initial connection process (for example, the network entry process of the initial connection process) to establish a connection with the MS 100 and the BS 200. Thus, the network entry processor 123 receives the message for the initial connection process transmitted from the BS 200 or transmits the message for the initial connection process to the BS 200, in accordance with the predetermined protocol via the wireless transmission/reception processor 110.

The network discovery processor 124 performs a synchronization process with respect to another BS 200 other than the SBS 200 by synchronizing a frequency which is used by the wireless transmission/reception processor 110 with a frequency which is pre-set in the MS 100. Moreover, as a result of the scan process, if there is another synchronizable BS 200, the network discovery processor 124 receives the frame 400 transmitted from the another synchronizable BS 200 via the wireless transmission/reception processor 110. Moreover, as detailed later, the network discovery processor 124 obtains the NAP ID of the NAP 210 to which another BS 200 belongs and the NSP ID of the NSP 310 from which the service can be used via another BS 200, from the received frame 400.

Incidentally, the BS 200 to which the network discovery processor 124 performs the scan process is preferably the BS 200 which belongs to the NAP 210 that is different from the NAP 210 to which the SBS 200 belongs.

The adjacent information receiver 125 receives an adjacent BS information message (e.g. a MOB_NBR_ADV message described later) from the SBS 200 via the wireless transmission/reception processor 110. Each BS 200 detects the presence of another BS 200 adjacent to each BS 200 (in other words, located close to each BS 200 or within a predetermined distance from each BS 200), regularly or irregularly. As a result, each BS 200 transmits the adjacent BS information message including the BS ID of the detected another BS 200, to the MS 100. Moreover, the adjacent information receiver 125 stores the adjacent BS information message (or the BS ID included in the adjacent BS information message) in an available BS list 131.

Incidentally, the adjacent BS information message received by the adjacent information receiver 125 preferably indicates the BS 200 which belongs to the NAP 210 to which the SBS 200 belongs and which is adjacent to the SBS 200.

The discovery trigger judgment device 126 judges whether or not another BS 200 that could be a handover destination exists in the NAP 210 to which the SBS 200 belongs, if the radio field intensity of the SBS 200 is less than or equal to a predetermined threshold value.

The discovery timing controller 127 obtains the timing information (e.g. a B.C.Pointer message 415 described later) transmitted from the BS 200 via the wireless transmission/reception processor 110. The discovery timing controller 127 synchronizes with the BS 200 which transmits the SII-ADV message 421, in accordance with the transmission timing of the SII-ADV message 421 indicated by the timing information.

The NAP change judgment device 128 controls each part in the controller 120 (for example, the network entry processor 123 or the like) to establish the connection with the BS 200 which belongs to another NAP 210, if the connection with the SBS 200 is lost when another BS 200 that could be the handover destination does not exist in the NAP 210 to which the SBS 200 belongs.

The memory 130 includes a memory area for temporarily store data to be used within the MS 100. The memory 130 may include a memory area or the like in which a program (i.e. firmware) for performing the operation as the MS 100 is stored. As the memory 130, a semiconductor memory, such as RAM (Random Access Memory), and other various recording media are listed as one example.

The memory 130 stores therein an available BS list 131, a frequency list 132, a discovery NAP/NSP list 133, and a preferred NAP/NSP list 134.

The available BS list 131 includes a list of the BSs 200 indicated by the adjacent BS information message. In other words, the available BS list 131 includes a list of the BSs 200 adjacent to the SBS 200. The BS 200 illustrated in the available BS list 131 could be the handover destination.

The frequency list 132 includes a list of frequencies used for the wireless communication in the wireless communication system 1000. The frequency list 132 is preferably pre-set in the memory 130 of the MS 100.

The discovery NAP/NSP list 133 includes a list of the NAP IDs and the NSP IDs obtained as a result of the process by the network discovery processor 124.

The preferred NAP/NSP list 134 includes a list indicating the priority of the NAP 210 and the NSP 310 to be connected by the MS 100. The preferred NAP/NSP list 134 is preferably pre-set in the memory 130 of the MS 100. However, the preferred NAP/NSP list 134 may be generated or updated as occasion demands.

(2-4) Operation of Wireless Communication System

Figure 7:
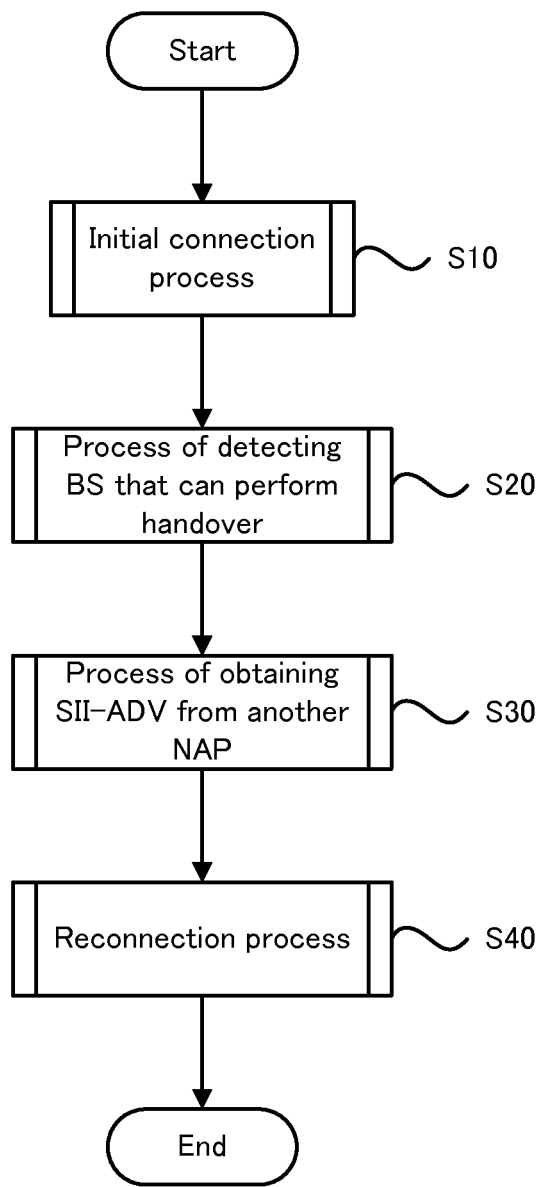
FIG. 7 is a flowchart illustrating an entire flow of the operations in the wireless communication system of the second embodiment.

With reference to FIG. 7, an explanation will be given on a flow of the operations in the wireless communication system 1000 of the second embodiment. FIG. 7 is a flowchart illustrating an entire flow of the operations in the wireless communication system 1000 of the second embodiment.

As illustrated in FIG. 7, in an initial state in which the connection between the MS 100 and the BS 200 is not established (e.g. in a state immediately after the power of the MS 100 is changed to ON), the initial connection process for establishing a connection between the MS 100 and one of the plurality of BSs 200 is performed (step S10). Here, the initial connection for establishing a connection between the MS 100 and the BS 200 which belongs to the NAP(#1) 210 is assumed to be performed.

Then, the wireless communication (i.e. the wireless transmission/reception of the data) between the MS 100 and the BS 200 with which the connection is established (i.e. the SBS 200) is started. As a result, the MS 100 can receive the service provided by the NSP(#1) 310 via the SBS 200 (in other words, via the NAP(#1) 210 to which the SBS 200 belongs).

Subsequently to or in parallel with the wireless communication, the MS 100 detects whether or not another BS 200 that could be the handover destination exists in the NAP(#1) 210 to which the SBS 200 belongs (step S20). For example, if the MS 100 exists at a position distant from the cell of another BS 200 other than the SBS 200 or near the border of the wireless access network provided by the NAP(#1) 210, it can be detected that the BS 200 that could be the handover destination does not exist in the NAP(#1) 210 to which the SBS 200 belongs.

As a result of the judgment in the step S20, if the BS 200 that could be the handover destination does not exist in the NAP(#1) 210 to which the SBS 200 belongs, the MS 100 obtains the SII-ADV message 421 from the BS 200 which belongs to the NAP(#2) 210 which is different from the NAP (#1) 210 (or another NAP 210 that is not illustrated in FIG. 3) (step S30).

Then, when the wireless communication cannot be performed with the SBS 200 (or the connection is cut), the MS 100 performs a reconnection process for establishing a connection with the BS 200 which belongs to the NAP(#2) 210 (or another NAP 210 that is not illustrated in FIG. 3), with reference to the SII-ADV message 421 obtained in the step S30 (step S40).

Next, each of the processes in the step S10 to the step S40 illustrated in FIG. 7 will be explained in more detail with referenced to FIG. 8 to FIG. 17.

(2-4-1) Initial Connection Process

Figures 8, 9:
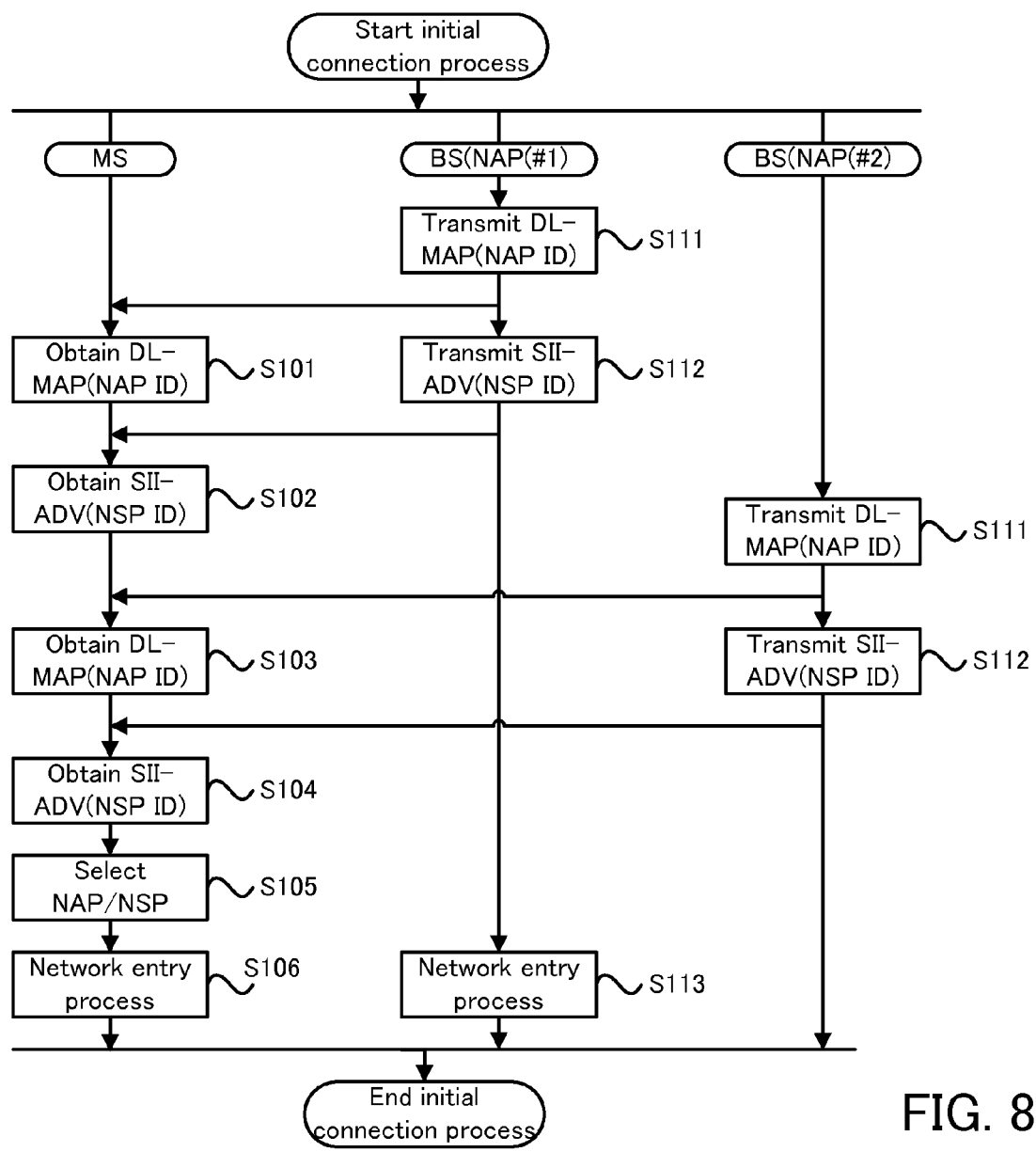
FIG. 8 is a flowchart illustrating a flow of an initial connection process.
FIG. 9 is a table illustrating a frequency list.

With reference to FIG. 8 and FIG. 9, the "initial connection process" in the step S10 in FIG. 7 will be explained. FIG. 8 is a flowchart illustrating a flow of the initial connection process. FIG. 9 is a table illustrating the frequency list 132.

As illustrated in FIG. 8, even in the initial state in which the connection between the MS 100 and the BS 200 is not established, the BS 200 transmits the frame 400 which includes the header portion 410 including the DL-MAP 413 and the DL sub-frame portion 420 including the SII-ADV message 421, under the control of the controller 203 (step S111, step S112).

The wireless transmission/reception processor 110 of the MS 100 sequentially performs the synchronization process on the frequencies listed in the frequency list 132. In other words, the MS 100 performs the synchronization process with the BS 200 which performs the wireless communication by using the frequency listed in the frequency list 132.

As illustrated in FIG. 9, the frequency list 132 is, for example, a list in which a center frequency and a bandwidth make a pair. The wireless transmission/reception processor 110 performs the synchronization with the BS 200 while sequentially changing the frequency which is used by the wireless transmission/reception processor 110, in accordance with the center frequencies illustrated in the frequency list 132.

As a result, the MS 100 receives the frame 400 from the synchronized BS 200. Then, the MS 100 obtains the NAP ID of the NAP 210 to which the BS 200 which has transmitted the frame 400 belongs, with reference to the DL-MAP 413 included in the received frame 400, under the control of the controller 120 (step S101). The MS 100 obtains the NSP ID of the NSP 310 which provides the service via the BS 200 which has transmitted the frame 400, with reference to the DL sub-frame portion 420 included in the received frame 400, under the control of the controller 120 (step S102). Incidentally, FIG. 8 illustrates an example in which synchronization is firstly achieved with any of the BS(#1) 200 to the BS(#4) which belong to the NAP(#1) 210. Therefore, in the step S101 and the step S102, the NAP ID of the NAP(#1) 210 and the NSP ID of the NSP(#1) 310 are obtained.

Then, the MS 100 further changes the frequency used by the wireless transmission/reception processor 110 and receives the frame 400 from another BS 200 with which synchronization is newly achieved. Thereby, the MS 100 obtains the NAP ID of the NAP 210 to which another BS 200 belongs and the NSP ID of the NSP 310 which provides the service via another BS 200 (step S103, step S104). Incidentally, FIG. 8 illustrates an example in which synchronization is achieved with any of the BS(#5) 200 to the BS(#8) which belong to the NAP(#2) 210. Therefore, in the step S103 and the step S104, the NAP ID of the NAP(#2) 210 and the NSP ID of the NSP(#2) 310 are obtained.

The MS 100 performs the aforementioned operation of obtaining the DL-MAP 413 and the SII-ADV message 421 (i.e. the operation of obtaining the NAP ID and the NSP ID), on all center frequencies pre-set in the frequency list 132.

Then, the MS 100 selects the NAP 210 with which the MS 100 actually performs the wireless communication, from the NAP(s) 210 indicated by the obtained NAP ID(s), under the control of the controller 120 (step S105). The MS 100 selects the NSP 310 from which the MS 100 actually receives the service, from the NSP(s) 310 indicated by the obtained NSP ID(s), under the control of the controller 120 (step S105). The MS 100 may select the NAP 210 with which the MS 100 actually performs the wireless communication and the NSP 310 from which the MS 100 actually receives the service, on the basis of the preferred NAP/NSP list 134 described later.

Alternatively, the NAP(s) 210 indicated by the obtained NAP ID(s) and the NSP(s) 310 indicated by the obtained NSP ID(s) may be presented to a user of the MS 100, and the desired NAP 210 and the desired NSP 310 may be selected by the user. Incidentally, here, as described above, the NAP(#1) 210 and the NSP(#1) 310 may be assumed to be selected.

Then, the network entry processor 123 provided for the MS 100 performs the network entry process, with respect to the BS 200 which belongs to the selected NAP(#1) 210 (step S106). Moreover, in the same manner, the BS 200 which is a target of the network entry process also performs the network entry process by the operation of the network entry processor 206 (step S113). As a result, the connection is established between the MS 100 and the BS 200 which belongs to the NAP(#1) 210.

(2-4-2) Process of Detecting BS on which Handover can be Performed

Figure 10:
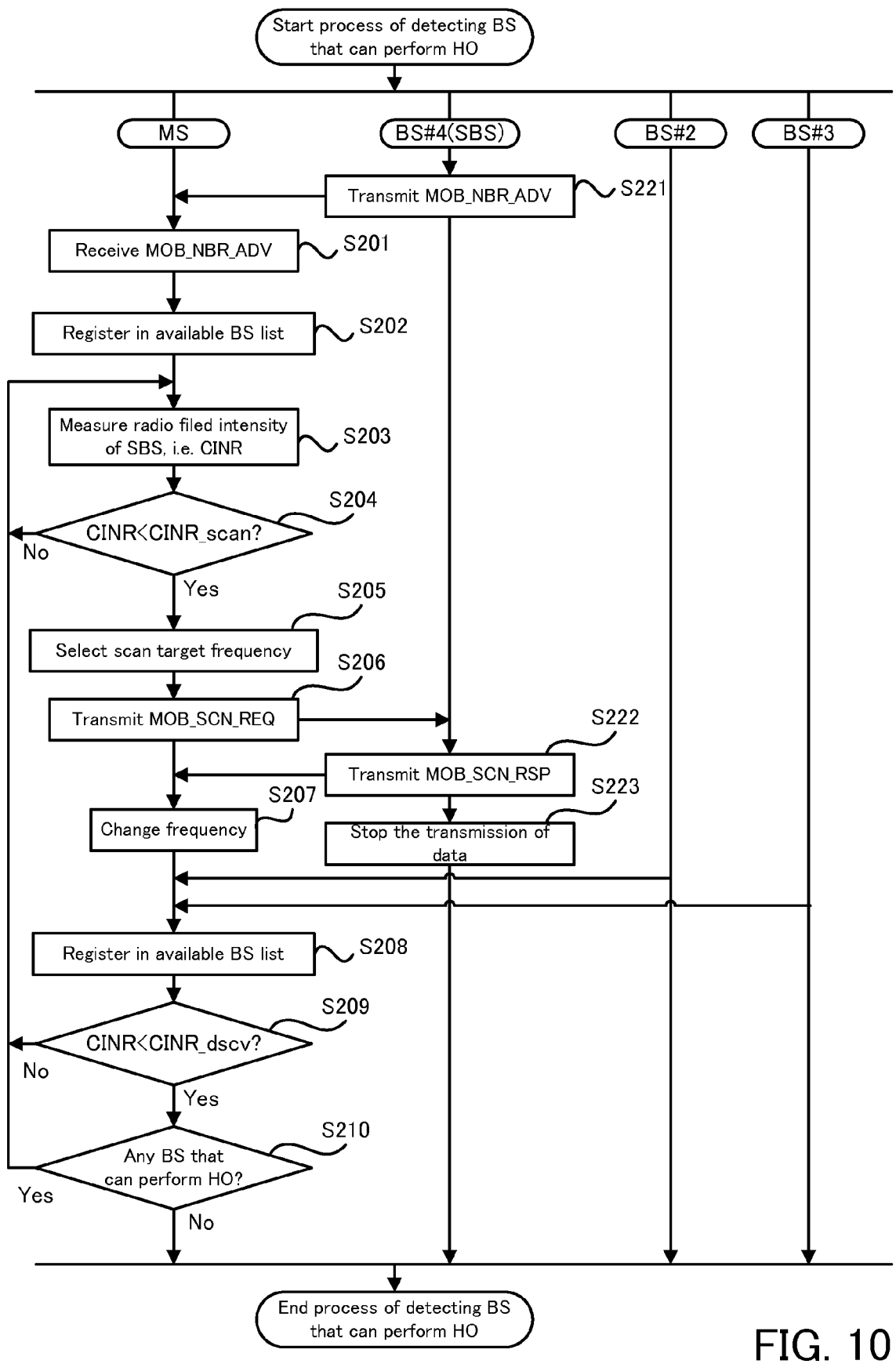
FIG. 10 is a flowchart illustrating a flow of a process of detecting whether or not another BS that could be a handover destination exists in an NAP to which a SBS belongs.
Figure 11:
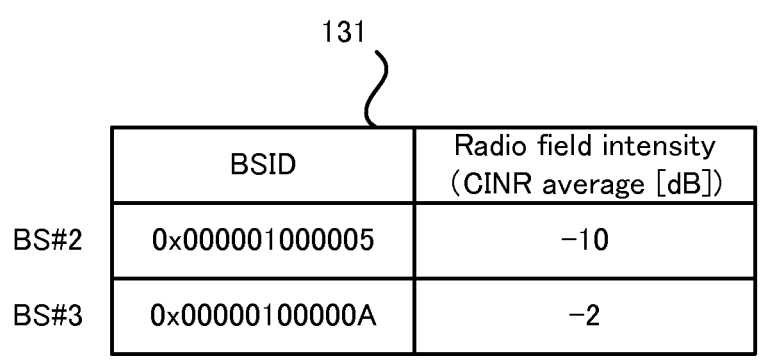
FIG. 11 is a table illustrating an available BS list.

With reference to FIG. 10 and FIG. 11, an explanation will be given on the "process of detecting whether or not another BS 200 that could be the handover destination exists in the NAP(#1) 210 to which the SBS 200 belongs" in the step S20 in FIG. 7. FIG. 10 is a flowchart illustrating a flow of the process of detecting whether or not another BS that could be the handover destination exists in the NAP(#1) 210 to which the SBS 200 belongs. FIG. 11 is a table illustrating the available BS list 131. In the following explanation, an explanation will be given on the premise that the connection between the MS 100 and the BS(#4) is established (in other words, the MS 100 performs the wireless communication with the BS(#4)). However, the same operation can be performed even if the connection is established with the BS 200 other than the BS(#4) 200.

As illustrated in FIG. 10, the BS(#4) 200, which establishes the connection with the MS 100 (i.e. the SBS 200), transmits a MOB_NBR_ADV message, which is the adjacent BS information message, to the MS 100 under the control of the controller 203 (step S221). Incidentally, an explanation will be given on an example in a case where the BS(#2) 200 and the BS(#3) 200 illustrated in FIG. 3 are adjacent to the SBS 200 and the BS(#1) 200 illustrated in FIG. 3 is not adjacent to the SBS 200. Thus, the MOB_NBR_ADV message includes the BS ID of each of the BS(#2) 200 and the BS(#3) 200.

The MOB_NBR_ADV message transmitted by the SBS 200 is received by the adjacent information receiver 125 provided for the MS 100 (step S201) and is registered in the available BS list 131 (step S202).

The MS 100 transmits and receives the frame 400 with the SBS 200 while measuring the CINR, which is the radio field intensity of the SBS 200, by the operation of the radio field intensity measurement device 122 (step S203). For example, the MS 100 measures the CINR of the preamble signal 411 of the received frame 400.

The MS 100 judges whether or not the CINR, which is the radio field intensity of the SBS 200, is less than a predetermined threshold value CINR_scan, under the control of the controller 120 (step S204).

As a result of the judgment in the step S204, if it is judged that the CINR, which is the radio field intensity of the SBS 200, is not less than the predetermined threshold value CINR_scan (the step S204: No), the operational flow returns to the step S203, and the measurement of the CINR, which is the radio field intensity of the SBS 200, is continued while the frame 400 is transmitted and received with the SBS 200.

On the other hand, as a result of the judgment in the step S204, if it is judged that the CINR, which is the radio field intensity of the SBS 200, is less than the predetermined threshold value CINR_scan (the step S204: Yes), the MS 100 performs the measurement process (i.e. the scan process) of the radio field intensity of the BS 200 registered in the available BS list 131. In other words, the MS 100 measures the radio field intensity of the other BS(#2) 200 and BS(#3) 200 that are adjacent to the SBS 200.

Specifically, firstly, the MS 100 selects a scan target frequency under the control of the controller 120 (step S205). Specifically, the MS 100 selects the frequency used by the BS 200 registered in the available BS list 131, as the scan target frequency. Therefore, the MS 100 sequentially selects each of the frequency used by the BS (#2) 200 and the frequency used by the BS(#3) 200, as the scan target frequency.

The MS 100 transmits a MOB_SCN_REQ message, which is the scan request message, to the SBS 200 by the operation of the scan request device 121, in order to temporarily stop the wireless communication with the SBS 200 (step S206). The MOB_SCN_REQ message preferably designates a period in which the SBS 200 temporarily stops the wireless communication.

The SBS 200, which has received the MOB_SCN_REQ message from the MS 100, transmits a MOB_SCN_RSP message, which is a scan response message and which indicates that the MOB_SCN_REQ message is received, to the MS 100 under the control of the controller 203 (step S222). Then, the SBS 200 temporarily stops the wireless communication with the MS 100 in the period designated by the MOB_SCN_REQ message (step S223). In other words, the SBS 200 temporarily stops the transmission/reception of the data with respect to the MS 100.

The MS 100, which has received the MOB_SCN_RSP message from the SBS 200, changes the frequency used by the wireless transmission/reception processor 110 to the scan target frequency selected in the step S205, by the operation of the wireless transmission/reception processor 110 (step S207). Then, the radio frequency intensity measurement device 122 measures the radio frequency intensity of the BS 200 which uses the scan target frequency. Specifically, the MS 100 changes the frequency used by the wireless transmission/reception processor 110 to the frequency used by the BS(#2) 200 by the operation of the wireless transmission/reception processor 110, and the MS 100 measures the radio field intensity of the BS(#2) 200 by the operation of the radio frequency intensity measurement device 122. In the same manner, the MS 100 changes the frequency used by the wireless transmission/reception processor 110 to the frequency used by the BS(#3) 200 by the operation of the wireless transmission/reception processor 110, and the MS 100 measures the radio field intensity of the BS(#3) 200 by the operation of the radio frequency intensity measurement device 122.

Incidentally, depending on timing at which the MOB_NBR_ADV message is transmitted from the SBS 200, the operations in the step S203 to the step S207 may be performed before the operation of receiving the MOB_NBR_ADV message in the step S201. In this case, for example, the aforementioned scan process may be performed on the BS 200 corresponding to a frequency with the strongest radio field intensity from among the center frequencies pre-set in the frequency list.

The measured radio field intensity is registered in the available BS list 131 in association with the BS ID (step S208). As a result, the available BS list 131 is a list on which the BS ID and the radio field intensity of the BS indicated by the BS ID make a pair.

The MS 100 judges whether or not the CINR, which is the radio field intensity of the SBS 200 measured in the step S203, is less than a predetermined threshold value CINR_dscv, which is less than the threshold value CINR_scan used for the judgment operation in the step S204, by the operation of the discovery trigger judgment device 126 (step S209).

As a result of the judgment in the step S209, if it is judged that the CINR, which is the radio field intensity of the SBS 200, is not less than the predetermined threshold value CINR_dscv (the step S209: No), the operational flow returns to the step S203, and the operations in the step S203 to the step S208 are repeated.

On the other hand, as a result of the judgment in the step S209, if it is judged that the CINR, which is the radio field intensity of the SBS 200, is less than the predetermined threshold value CINR_dscv (the step S209: Yes), the MS 100 judges whether or not the BS 200 that allows the handover exists in the NAP(#1) 210 to which the SBS 200 belongs, by the operation of the discovery trigger judgment device 126 (step S210).

Specifically, the MS 100 judges whether or not the handover can be performed on the BS(#2) 200 and the BS(#3) 200 indicated by the BS IDs registered in the available BS list 131. The judgment operation is performed on the basis of the radio field intensity of each of the BS(#2) 200 and the BS(#3) 200 registered in the available BS list 131. For example, if the radio field intensity of at least one of the BS(#2) 200 and the BS(#3) 200 indicated by the BS IDs registered in the available BS list 131 is greater than or equal to a predetermined threshold value CINR_HO which indicates the radio field intensity that allows the wireless communication, it is judged that the BS 200 that allows the handover exists in the NAP(#1) 210. On the other hand, if the radio field intensities of both the BS(#2) 200 and the BS(#3) 200 indicated by the BS IDs registered in the available BS list 131 are less than the predetermined threshold value CINR_HO, it is judged that the BS 200 that allows the handover does not exist in the NAP(#1) 210.

As a result of the judgment in the step S210, if it is judged that the BS 200 that allows the handover exists in the NAP(#1) 210 to which the SBS 200 belongs (the step S210: Yes), the operational flow returns to the step S203, and the operations in the step S203 to the step S209 are repeated. At this time, the wireless communication with the SBS 200 may be continuously performed. Alternatively, depending on the radio field intensity of the SBS 200, the handover may be performed on the BS(#2) and the BS(#3).

On the other hand, as a result the judgment in the step S210, the BS 200 that allows the handover does not exist in the NAP(#1) 210 to which the SBS 200 belongs (the step S210: No), the MS 100 obtains the SII-ADV message 421 from the BS 200 which belongs to the NAP(#2) 210 (or another NAP 210 not illustrated in FIG. 3) which is different from the NAP(#1) 210 (refer to the step S30 in FIG. 7).

(2-4-3) Process of Obtaining SII-ADV Message from Another NAP

Figure 12:
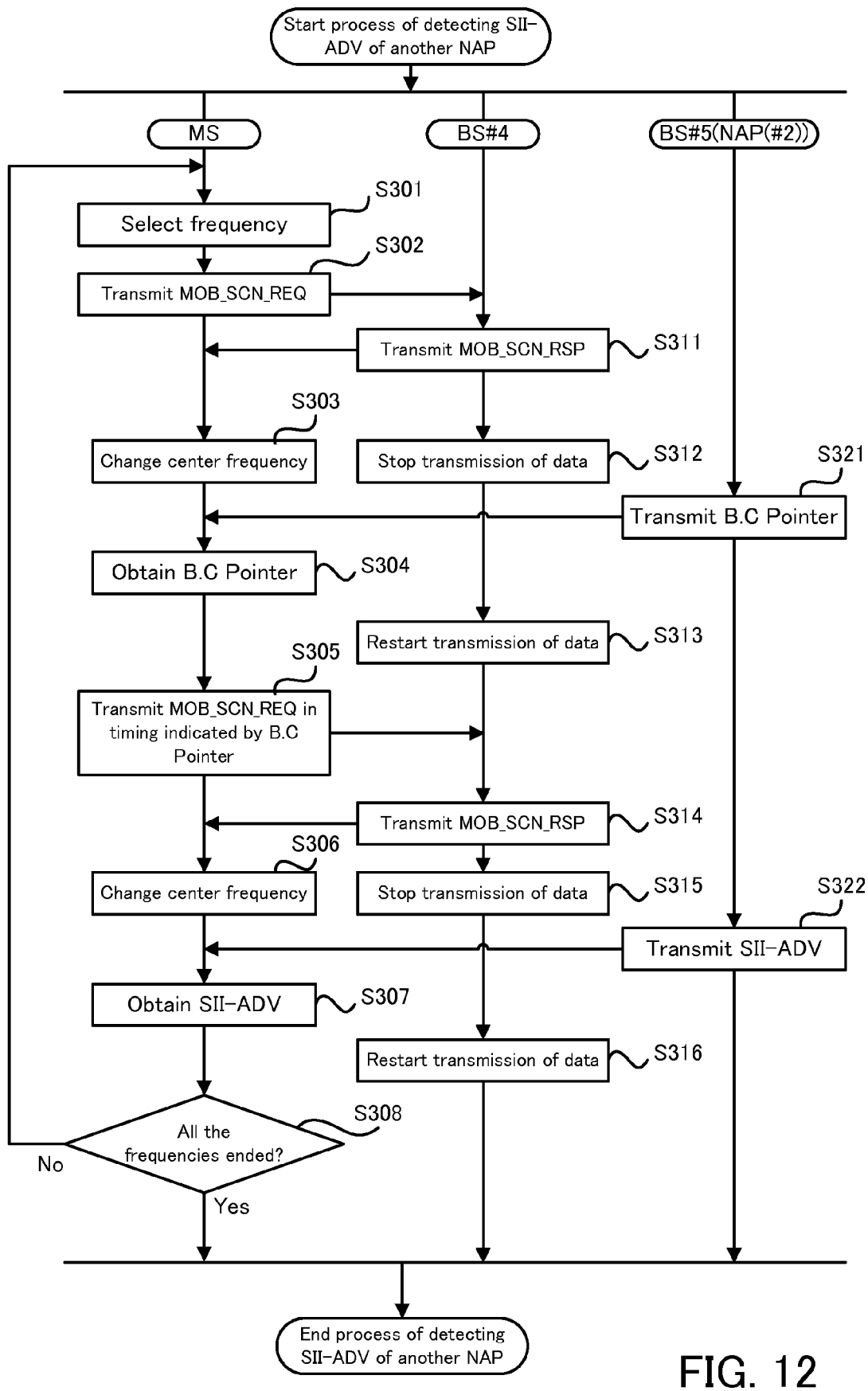
FIG. 12 is a flowchart illustrating a flow of a process of obtaining a SII-ADV message from another NAP that is different from the NAP to which the SBS belongs.
Figure 13:
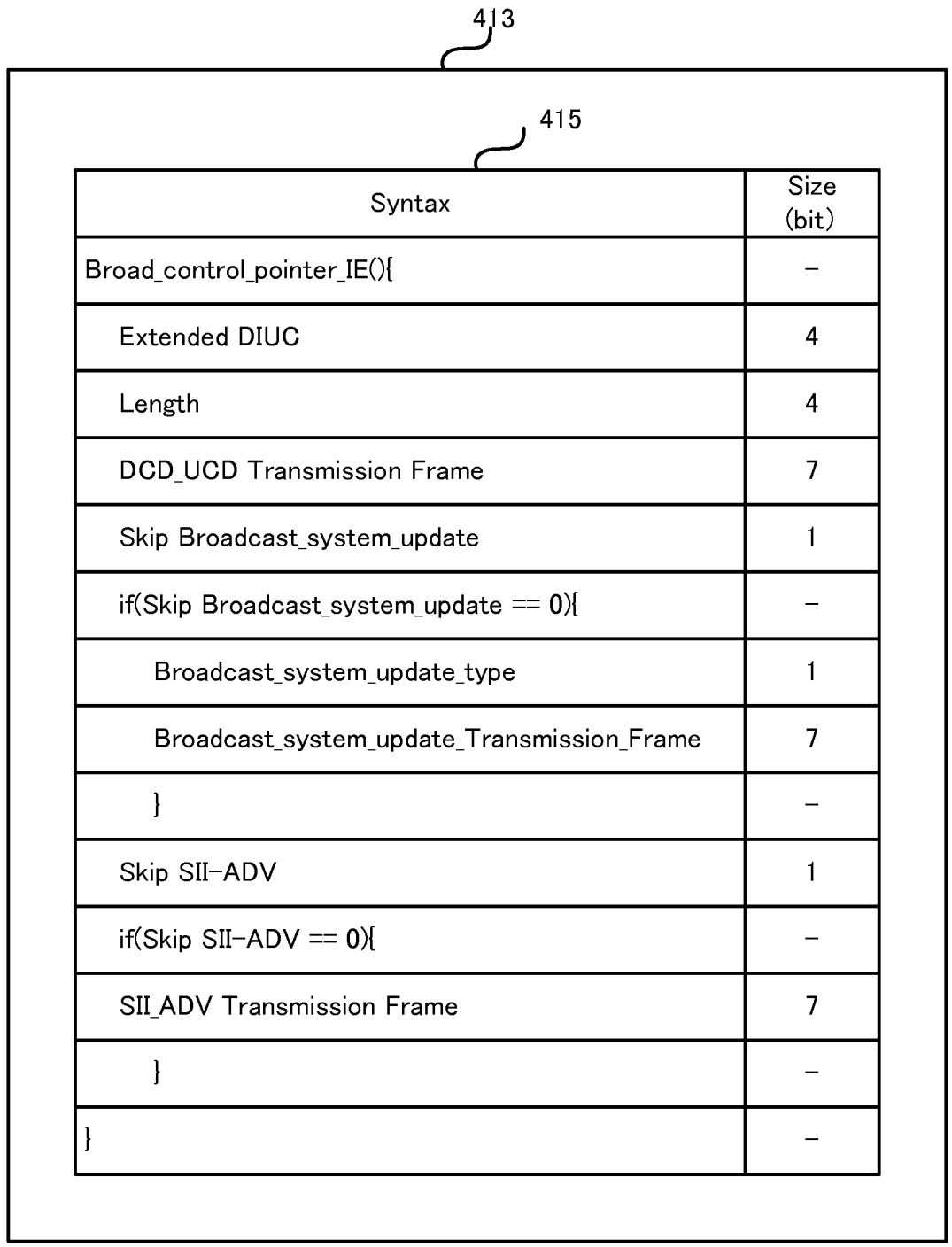
FIG. 13 is a data structure diagram illustrating the data structure of a B. C. Pointer message included in a DL-MAP in the frame.

With reference to FIG. 12 to FIG. 15, an explanation will be given on the "process of obtaining the SII-ADV message 421 from another NAP 210 that is different from the NAP 210 to which the SBS 200 belongs" in the step S30 in FIG. 7. FIG. 12 is a flowchart illustrating a flow of the process of obtaining the SII-ADV message 421 from another NAP 210 that is different from the NAP 210 to which the SBS 200 belongs. FIG. 13 is a data structure diagram illustrating the data structure of a B. C. Pointer message included in the DL-MAP 413 in the frame 400. FIG. 14 is data structure diagram illustrating the data structure of the SII-ADV message 421 included in the DL sub frame portion 420 in the frame 400. FIG. 15 is a table illustrating the discovery NAP/NSP list 133.

As illustrated in FIG. 12, the MS 100 selects the frequency used by the wireless transmission/reception processor 110 in order to obtain the SII-ADV message 421, with reference to the frequency list 132 (step S301). For example, the center frequency indicated on the first line of the frequency list 132 may be selected as the frequency used by the wireless transmission/reception processor 110 to obtain the SII-ADV message 421.

The MS 100 transmits the MOB_SCN_REQ message to the SBS 200 by the operation of the scan request device 121, in order to temporarily stop the wireless communication with the SBS 200 (step S302).

The SBS 200, which has received the MOB_SCN_REQ message from the MS 100, transmits the MOB_SCN_RSP message to the MS 100 under the control of the controller 203 (step S311). Then, the SBS 200 temporarily stops the wireless communication with the MS 100 in the period designated by the MOB_SCN_REQ message (step S312).

The MS 100, which has received the MOB_SCN_RSP message from the SBS 200, changes the frequency used by the wireless transmission/reception processor 110 to the frequency selected in the step S301, under the control of the discovery timing control controller 127, in the period designated by the MOB_SCN_REQ message (step S303). As a result, the MS 100 is synchronized with the BS 200 which belongs to the NAP(#2) 210 that uses the frequency selected in the step S301. Incidentally, an explanation will be given on an example in which the MS 100 is synchronized with the BS(#5) 200 which belongs to the NAP(#2) 210.

The BS(#5) 200 transmits the frame 400 under the control of the controller 203. In the second embodiment, each BS 200 transmits the frame 400 including a B. C. Pointer message 415, which indicates the transmission timing of the SII-ADV message 421, in the DL-MAP 413, by the operation of the network configuration information transmitter 205 (step S321).

The network configuration transmitter 205 preferably transmits the frame 400 such that the transmission frequency of the B. C. Pointer message 415 is higher than that of the SII-ADV message 421. For example, if the SII-ADV message 421 is transmitted every five seconds, the network configuration transmitter 205 preferably transmits the frame 400 such that the B. C. Pointer message 415 is transmitted at frequency of five seconds or less.

The MS 100 obtains the frame 400 transmitted from the BS(#5) 200, by the operation of the network discovery processor 124. The MS 100 obtains the B. C. Pointer message 415 from the obtained frame 400, by the operation of the network discovery processor 124 (step S304). The obtained B. C. Pointer message 415 is outputted from the network discovery processor 124 to the discovery timing controller 127.

At this time, the MS 100 preferably obtains the NAP ID included in the DL-MAP 413 from the obtained frame 400, by the operation of the network discovery processor 124. The obtained NAP ID is preferably registered in the discovery NAP/NSP list 133.

With reference to FIG. 13, an explanation will be given on the data structure of the B. C. Pointer message 415 included in the DL-MAP 413. As illustrated in FIG. 13, the B. C. Pointer message 415 included in the DL-MAP 413 includes an Extended DIUC (Downlink Interval Usage Code) field, a Length field, a DCD_UCD (Downlink Channel Description_Uplink Channel Description) Transmission Frame field, a Skip Broadcast_system_update field, a Broadcast_system_update_type field, a Broadcast_system_update_Transmission_Frame field, a Skip SII-ADV field, and a SII-ADV Transmission Frame field.

The Extended DIUC field has a field with a size of 4 bits. The Extended DIUC field stores therein "0x0a" which is an identification number indicating the B. C. Pointer message 415.

The Length field is a field with a size of 4 bits. The Length field stores therein information indicating the size of fields which follows the Length field.

The DCD_UCD Transmission Frame field is a field with a size of 7 bits. The DCD_UCD Transmission Frame field stores therein the number (for example, low 7 bits of the number) of the frame 400 for transmitting at least one of the next DCD message and the UCD message.

The Skip Broadcast_system_update field is a field with a size of 1 bit. The Skip Broadcast_system_update field stores therein information indicating whether or not update information about the entire system is included in the frame 400. Specifically, for example, if "0" is stored in the Skip Broadcast_system_update field, the update information about the entire system is included in the frame 400. On the other hand, if "1" is stored in the Skip Broadcast_system_update field, the update information about the entire system is not included in the frame 400. As the update information about the entire system, for example, the aforementioned MOB_NBR_ADV message, an emergency service message, and the like are listed as one example.

The Broadcast_system_update_type field is a field with a size of 1 bit. The Broadcast_system_update_type field stores therein information indicating the type of the update information about the entire system included in the frame 400. For example, if "0" is stored in the Broadcast_system_update_type field, the MOB_NBR_ADV message is included in the frame 400. On the other hand, if "1" is stored in the Broadcast_system_update_type field, the emergency service message is included in the frame 400.

The Broadcast_system_update_Transmission_Frame field is a field with a size of 7 bit. The Broadcast_system_update_Transmission_Frame field stores therein the number (for example, low 7 bits of the number) of the frame 400 for transmitting at least one of the next MOV_NBR_ADV message and the next emergency service message.

The Broadcast_system_update_type field and the Broadcast_system_update_Transmission_Frame field may not be used nor referred to if "1" is stored in the Skip Broadcast_system_update field.

The Skip SII-ADV field is a field with a size of 1 bit. The Skip SII-ADV field stores therein information indicating whether or not the SII-ADV 421 is included in the frame 400. Specifically, for example, if "0" is stored in the Skip SII-ADV field, the SII-ADV 421 is included in the frame 400. On the other hand, if "1" is stored in the Skip SII-ADV field, the SII-ADV message 421 is not included in the frame 400.

The SII-ADV Transmission Frame field is a field with a size of 7 bits. The SII-ADV Transmission Frame field stores therein the number (for example, low 7 bits of the number) of the frame 400 for transmitting the next SII-ADV message 421.

The SII-ADV Transmission Frame field may not be used nor referred to if "1" is stored in the Skip SII-ADV field.

In FIG. 12 again, when the period designated by the scan request message MOB_SCN_REQ message, which is transmitted in the step S302, is passed, the MS 100 returns the frequency used by the wireless transmission/reception processor 110 to the frequency used by the SBS 200. The SBS 200 restarts the wireless communication with the MS 100 (step S313). In other words, the SBS 200 restarts the transmission/reception of the data with respect to the MS 100.

Then, the MS 100 temporarily stops the wireless communication with the SBS 200 in the timing indicated by the SII-ADV Transmission Frame field in the B. C. Pointer message 415 obtained in the step S304 (i.e. the timing at which the next SII-AV message 421 is transmitted) by the operation of the discovery timing controller 127. Specifically, the MS 100 transmits the MOB_SCN_REQ message, which is the scan request message, in the timing indicated by the SII-ADV Transmission Frame field in the B.C.Pointer 415 obtained in the step S304, to the SBS 200, by the operation of the scan request device 121 controlled by the discovery timing controller 127 (step S305).

The SBS 200, which has received the MOB_SCN_REQ message as the scan request message from the MS 100, transmits the MOB_SCN_RSP message, which is the scan response message, to the MS 100 (step S314). Then, the SBS 200 temporarily stops the wireless communication with the MS 100 in the period designated by the MOB_SCN_REQ message (step S315).

The MS 100, which has received the MOB_SCN_RSP message as the scan response message from the SBS 200, changes the frequency used by the wireless transmission/reception processor 110 to the frequency selected in the step S301, in the period designated by the scan request message MOB_SCN_REQ message (step S306). In this period, the frame 400 including the SII-ADV message 421 is transmitted from the BS(#5) 200 (step S322). As a result, the MS 100 obtains the SII-ADV message 421 by the operation of the network discovery processor 124 (step S307). The NSP ID included in the SII-ADV message 421 is registered in the discovery NAP/NSP list 133.

With reference to FIG. 14, the data structure of the SII-ADV message 421 will be explained. As illustrated in FIG. 14, the SII-ADV message 421 includes a Management message type field, a TLV type field, a Length field, an NSP ID (k) (wherein k is an integer satisfying $1 \leq k \leq n$) field, a TLV type filed, an NSP Name Length (k) field, and an NSP Name (k) field.

By the NSP ID (k) field of these fields, the NSP ID of the NSP 310 from which the service can be received via the BS 200 is specified. By the NSP Name Length (k) field and the NSP Name (k) field, the name of the NSP 310 from which the service can be received via the BS 200 is specified.

In FIG. 12 again, when the period designated by the MOB_SCN_REQ message, which is transmitted in the step S305, is passed, the MS 100 returns the frequency used by the wireless transmission/reception processor 110 to the frequency used by the SBS 200. The SBS 200 restarts the wireless communication with the MS 100 (step S316). In other words, the SBS 200 restarts the transmission/reception of the data with respect to the MS 100.

The MS 100 judges whether or not the operations in the step S302 to the step S307 are performed on all center frequencies indicated in the frequency list 132 (step S308).

As a result of the judgment in the step S308, if it is judged that the operations in the step S302 to the step S307 are not performed on all center frequencies indicated in the frequency list 132 (the step S308: No), the operational flow returns to the step S301. After a new frequency is selected (the step S301), the operations after the step S302 are performed.

On the other hand, as a result of the judgment in the step S308, if it is judged that the operations in the step S302 to the step S307 are performed on all center frequencies indicated in the frequency list 132 (the step S308: Yes), the MS 100 performs the reconnection process for establishing a connection with the BS 200 which belongs to the NAP(#2) 210 (or another NAP 210 not illustrated in FIG. 3), with reference to the discovery NAP/NSP list 133 generated as a result of the process of obtaining the SII-ADV message 421 (the step S40 in FIG. 7).

With reference to FIG. 15, the discovery NAP/NSP list 133 will be explained. As illustrated in FIG. 15, the discovery NAP/NSP list 133 is, for example, a list including the NAP ID included in the DL-MAP 413 obtained as a result of the obtaining process illustrated in FIG. 12 and the NSP ID included in the obtained SII-ADV message 421.

FIG. 15 illustrates an example in which the NSP(#3) 310 whose name is "AAAA" and the NAP(#3) 210 whose name is "aaaa" and which can access the NSP(#3) 310 are detected by using the first center frequency included in the frequency list 132, and in which the NAP(#2) 210 whose name is "bbbb" which can access the NSP(#2) 310 whose name is "BBBB" is detected by using the second center frequency included in the frequency list 132.

(2-4-4) Reconnection Process

With reference to FIG. 16 and FIG. 17, the "reconnection process" in the step S40 in FIG. 7 will be explained. FIG. 16 is a flowchart illustrating a flow of the reconnection process. FIGS. 17A and 17B are tables each illustrating the preferred NAP/NSP list.

As illustrated in FIG. 16, the MS 100 judges whether or not the MS 100 can perform the wireless communication with the SBS 200 (or whether or not the connection with the SBS 200 is lost) by the operation of the NAP change judgment device 128 (step S401). For example, the MS 100 may judge that the MS 100 cannot performs the wireless communication with the SBS 200 (or the connection is lost) if the frame 400 transmitted from the SBS 200 cannot be received in a predetermined period. As the predetermined period, a LOST_DL_MAP parameter pre-set in the memory 130 in the MS 100 may be used. Alternatively, the MS 100 may judge that the MS 100 cannot perform the wireless communication with the SBS 200 (or the connection is lost) if the radio field intensity of the SBS 200 is less than the aforementioned threshold value CINR_HO.

As a result of the judgment in the step S401, if it is judged that the MS 100 can perform the wireless communication with the SBS 200 (the step S401: No), the wireless communication with the SBS 200 is continued without change. In this case, FIG. 16 illustrates an example in which the MS 100 repeats the judgment of whether or not the MS 100 can perform the wireless communication with the SBS 200. However, the operational flow may return to the step S20 or the step S30 in FIG. 7, and the operations after the step S20 or the step S30 may be performed.

On the other hand, if it is judged that the MS 100 cannot perform the wireless communication with the SBS 200 (the step S401: Yes), the MS 100 selects the NAP 210 with which the MS 100 is to establish a new connection, by the operation of the NAP change judgment device 128 (step S402). This selection operation is performed on the basis of the discovery NAP/NSP list 133 and the preferred NAP/NSP list 134 described above.

The preferred NAP/NSP list 134, as illustrated in FIG. 17A, includes a list on which the priority of each of the NSPs 310 from which the MS 100 is to receive the service (in other words, the MS 100 desires to receive the service) is associated with the NSP ID. FIG. 17A illustrates an example in which the NSP(#1) 310 with an NSP ID of "0x000530" is registered as the highest priority NSP 310 and in which the NSP(#2) 310 with an NSP ID of "0x000AC0" is registered as the second highest priority NSP 310.

Moreover, the preferred NAP/NSP list 134, as illustrated in FIG. 17B, includes a list on which the priority of each of the NAPs 210 with which the MS 100 is to establish the connection (in other words, the MS 100 desires to establish the connection) is associated with the NAP ID. FIG. 17B illustrates an example in which the NAP(#1) 210 with an NAP ID of "0xE0D112" is registered as the highest priority NAP 210 and in which the NAP(#2) 210 with an NAP ID of "0xA3CD38" is registered as the second highest priority NAP 210.

A specific explanation will be given on the operation of selecting the NAP 210, with which the new connection is to be established, on the basis of the discovery NAP/NSP list 133 illustrated in FIG. 15 and the preferred NAP/NSP list 134 illustrated in FIG. 17. The NAP change judgment device 128 refers to the preferred NAP/NSP list 134 and thereby recognizes that the highest priority NSP 310 is the NSP(#1) 310. On the other hand, the NAP change judgment device 128 refers to the discovery NAP/NSP list 133 and thereby recognizes that the NSP(#1) 310 is not included in the discovery NAP/NSP list 133. Thus, the NAP change judgment device 128 recognizes that the MS 100 cannot receive the service from the NSP(#1) 310. Then, the NAP change judgment device 128 refers to the preferred NAP/NSP list 134 and thereby recognizes that the second highest priority NSP 310 is the NSP(#2) 310. Moreover, the NAP change judgment device 128 refers to the discovery NAP/NSP list 133 and recognizes that the NSP(#2) 310 is included in the discovery NAP/NSP list 133. In this case, the NAP change judgment device 128 further refers to the discovery NAP/NSP list 133 and thereby recognizes that the NSP(#2) 310 can be accessed via the NAP(#2) 210. As a result, the NAP change judgment device 128 selects the NAP(#2) 210 as the NAP 210 with which the new connection is to be established.

Then, the MS 100 changes the frequency used by the wireless transmission/reception processor 110 to the frequency used by the BS 200 (e.g. the BS(#5) 200) which belongs to the NAP(#2) 210 (step S403).

Then, the network entry processor 123 provided for the MS 100 performs the network entry process, with respect to the BS(#5) 200 which belongs to the selected NAP(#2) 210 (step S404). In the same manner, the BS(#5) 200 which is a target of the network entry process also performs the network entry process by the operation of the network entry processor 206 (step S411). As a result, the connection is established between the MS 100 and the BS(#5) 200 which belongs to the NAP (#2) 210. This makes it possible for the MS 100 to receive the service provided by the NSP(#1) 310 which makes the roaming contract with the NSP(#2), via the NSP(#2) 310 which can be used from the NAP(#2) 210.

As explained above, in the wireless communication system 1000 of the second embodiment, the MS 100 obtains the B. C. Pointer message 415 before obtaining the SII-ADV message 421. Thus, it is possible to relatively reduce the period in which the wireless communication between the MS 100 and the SBS 200 is temporarily stopped to obtain the SII-ADV message 421. For example, if the SII-ADV message 421 is obtained without receiving the B. C. Pointer message 415, it is necessary to ensure a relatively long period in which the wireless communication with the SBS 200 is temporarily stopped and to wait for the transmission of the SII-ADV message 421. In the second embodiment, however, if the wireless communication between the MS 100 and the SBS 200 is temporarily stopped at a pinpoint in accordance with the B. C. Pointer message 415, then, the SII-ADV message 421 can be obtained without ensuring the relatively long period in which the wireless communication between the MS 100 and the SBS 200 is temporarily stopped. By this, in comparison with a wireless communication system in which the SII-ADV message 421 is obtained without obtaining the B. C. Pointer message 415, it is possible to properly obtain the SII-ADV message 421 while relatively reducing the period in which the wireless communication between the MS 100 and the SBS 200 is temporarily stopped to obtain the SII-ADV message 421.

In the wireless communication system 1000 of the second embodiment, as described above, the transmission frequency of the B. C. Pointer message 415 may be set higher than the transmission frequency of the SII-ADV message 421. Thus, it is possible to obtain the SII-ADV message 421 after the setting of the period in which the wireless communication between the MS 100 and the SBS 200 is temporarily stopped to obtain the SII-ADV message 421, on the basis of the B. C. Pointer message 415 whose transmission frequency is relatively high. Thus, the relatively long period, in which the wireless communication between the MS 100 and the SBS 200 is temporarily stopped, may not be ensured to obtain the SII-ADV message 421 (or to wait for the transmission of the SII-ADV message 421) whose transmission frequency is relatively low. Thus, it is possible to properly obtain the SII-ADV message 421 while relatively reducing the period in which the wireless communication between the MS 100 and the SBS 200 is temporarily stopped to obtain the SII-ADV message 421.

In the wireless communication system 1000 of the second embodiment, since the DL-MAP 413 is used to transmit the B. C. Pointer message 415, it is possible to establish the aforementioned wireless communication system 1000 without significantly changing the structure of the frame 400 in IEEE802.16.

In the wireless communication system 1000 of the second embodiment, since the MS 100 requests that the SBS 200 temporarily stop the wireless communication between the MS 100 and the SBS 200, it is possible to properly ensure the period in which the wireless communication between the MS 100 and the SBS 200 is temporarily stopped.

In the wireless communication system 1000 of the second embodiment, it is possible to request the temporary stop period of the wireless communication for obtaining the B. C. Pointer message 415 and the SII-ADV message 421, by using the scan command for performing the scan process of measuring the radio field intensity. Therefore, a special command only to request the temporary stop period of the wireless communication for obtaining the B. C. Pointer message 415 and the SII-ADV message 421 may not be prepared.

However, the MS 100 may use a command to directly request the temporary stop of the wireless communication, in addition to or instead of the scan command for performing the scan process of measuring the radio field intensity, to request the temporary stop period of the wireless communication for obtaining the B. C. Pointer message 415 and the SII-ADV message 421. Alternatively, the MS 100 may also use some other command or message or the like to request the temporary stop period of the wireless communication for obtaining the B. C. Pointer message 415 and the SII-ADV message 421.

In addition to or instead of requesting by the MS 100 that the SBS 200 temporarily stop the wireless communication between the MS 100 and the SBS 200, the SBS 200 may request that the MS 100 temporarily stop the wireless communication between the SBS 200 and the MS 100. For example, in a case where the SBS 200 detects that there is little or no data to be transmitted and received between the SBS 200 and the MS 100, or in similar cases, the SBS 200 may allow the MS 100 to temporarily stop the wireless communication in a period specified by the SBS 200, and the MS 100 may obtain the B. C. Pointer message 415 and the SII-ADV message 421 in the period specified by the SBS 200.

The MS 100 can recognize the NSP 310 from which the MS 100 can receive the service via another NAP 210 that is different from the NAP 210 to which the SBS 200 belongs, while maintaining the connection with the SBS 200. Therefore, even if the connection between the MS 100 and the SBS 200 is lost when there is no BS 200 on which the handover can be performed, the DL-MAP 413 and the SII-ADV message 421 may not be obtained in order to obtain the NAP ID and the NSP ID again after the connection is lost. In other words, even if the connection between the MS 100 and the SBS 200 is lost when there is no BS 200 on which the handover can be performed, it is possible to establish the connection with another NAP 210 (or the BS 200 which belongs to another NAP 210) which can connect to the NSP 310 from which the MS 100 can receive the desired service, with reference to the already obtained discovery NAP/NSP list 133. By this, in comparison with a wireless communication system in which the NAP ID and the NSP ID are obtained after the loss of the connection with the SBS 200 and then a connection with another NAP 210 is established, it is possible to reduce a time required to establish the connection between the BS 200 which belongs to another NAP 210 and the MS 100 after the loss of the connection between the SBS 200 and the MS 100.

Incidentally, in the aforementioned second embodiment, such an example is explained that if another BS 200 that could be the handover destination does not exist in the NAP 210 to which the SBS 200 belongs, both the B. C. Pointer message 415 and the SII-ADV message 421 are obtained from the BS 200 in another NAP 210. However, even if another BS 200 that could be the handover destination exists in the NAP 210 to which the SBS 200 belongs, the B. C. Pointer message 415 may be obtained in advance from the BS 200 in another NAP 210. In this case, after it is judged that another BS 200 that could be the handover destination does not exist in the NAP 210 to which the SBS 200 belongs, the SII-ADV message 421 is obtained from the BS 200 in another NAP 210. Thus, it is possible to quickly obtain the SII-ADV message 421 after it is judged that another BS 200 that could be the handover destination does not exist in the NAP 210 to which the SBS 200 belongs. Alternatively, even if another BS 200 that could be the handover destination exists in the NAP 210 to which the SBS 200 belongs, both the B. C. Pointer message 415 and the SII-ADV message 421 may be obtained in advance. In this case, the SII-ADV message 421 or the like may not be obtained after it is judged that another BS 200 that could be the handover destination does not exist in the NAP 210 to which the SBS 200 belongs. Therefore, even if the connection between the SBS 200 and the MS 100 is lost suddenly or unexpectedly immediately after the aforementioned judgment or the like, the MS 100 can establish the connection with the BS 200 which belongs to another NAP 210.

In the aforementioned second embodiment, such an example is explained that the wireless communication between the MS 100 and the SBS 200 is restarted once after the B. C. Pointer message 415 is obtained, then the wireless communication is temporarily stopped again, and then the SII-ADV message 421 is obtained. However, if the timing indicated by the B. C. Pointer message 415 is the present time point (or a time point substantially regarded as the present time point), the SII-ADV message 421 may be obtained as it is, without restarting the wireless communication between the MS 100 and the SBS 200 once. By this, it is possible to reduce the number of the temporary stops of the wireless communication between the MS 100 and the SBS 200.

In the aforementioned second embodiment, such an example is explained that the NSP(#1) 310 and the NSP(#2) 310 make the roaming contract (i.e. the roaming contract between the NSPs 310 is made). However, for example, it may be a wireless communication system which employs a roaming contract which allows the service of the NSP(#1) 310 to be directly used from the NAP(#2) 210 (i.e. a roaming contract between the NAP 210 and the NSP 310). Even in this case, the aforementioned effect can be received by employing the aforementioned construction.

With regard to the first and second embodiments explained above, the following additional statements are further disclosed.

(Additional Statement 1)

A wireless terminal including:

a first obtaining device obtaining time point information from a second wireless base station in a first non-communication period in which communication with a first wireless base station which belongs to a first base station group is temporarily stopped, the time point information indicating a time point at which service information is transmitted from the second wireless base station, the service information indicating a service provided via the second wireless base station which belongs to a second base station group; and a second obtaining device obtaining the service information from the second wireless base station in a second non-communication period which is ensured in accordance with the time point indicated by the time point information and in which the communication with the first wireless base station is temporarily stopped.

(Additional Statement 2)

The wireless terminal according to the additional statement 1, wherein transmission frequency of the time point information is higher than transmission frequency of the service information.

(Additional Statement 3)

The wireless terminal according to the additional statement 1 or 2, further including a requesting device requesting at least one of the first non-communication period and the second non-communication period of the first wireless base station.

(Additional Statement 4)

The wireless terminal according to the additional statement 3, wherein the requesting device requests the second non-communication period of the first wireless base station in accordance with the time point indicated by the time point information.

(Additional Statement 5)

The wireless terminal according to the additional statement 3 or 4, wherein the requesting device requests at least one of the first non-communication period and the second non-communication period for the first wireless base station, by using a scan interval command for requesting a period in which a communication environment between the wireless terminal and another first wireless base station, which is adjacent to the first wireless base station with which the wireless terminal currently performs the communication, is measured.

(Additional Statement 6)

The wireless terminal according to the additional statement 3 or 4, wherein the requesting device requests at least one of the first non-communication period and the second non-communication period, by using an intermittent communication request command for requesting temporary stop of the communication with the first wireless base station with which the wireless terminal currently performs the communication.

(Additional Statement 7)

The wireless terminal according to any one of the additional statements 1 to 6, wherein the wireless terminal performs communication with each of the first wireless base station and the second wireless base station in accordance with a IEEE802.16 method, and the time point information is included in a DL-MAP (Down Link MAP).

(Additional Statement 8)

The wireless terminal according to the additional statement 7, wherein the time point information is included in a Broadcast Control Pointer message in the DL-MAP.

(Additional Statement 9)

The wireless terminal according to any one of the additional statements 1 to 8, wherein the first obtaining device obtains the time point information if another first wireless base station that allows handover from the first wireless base station with which the wireless terminal currently performs the communication does not exist in the first base station group.

(Additional Statement 10)

The wireless terminal according to any one of the additional statements 1 to 9, wherein the second obtaining device obtains the service information if another first wireless base station that allows handover from the first wireless base station with which the wireless terminal currently performs the communication does not exist in the first base station group.

(Additional Statement 11)

The wireless terminal according to any one of the additional statements 1 to 10, wherein the second obtaining device obtains the service information in the first non-communication period if the time point indicated by the time information is included in the first non-communication period.

(Additional Statement 12)

A wireless base station including:

a first transmitting device transmitting time point information indicating a time point at which service information is transmitted, the service information indicating a service provided via the wireless base station; and a second transmitting device transmitting the service information.

(Additional Statement 13)

The wireless base station according to the additional statement 12, wherein transmission frequency of the time point information is higher than transmission frequency of the service information.

(Additional Statement 14)

The wireless base station according to the additional statement 12 or 13, wherein the wireless base station performs communication in accordance with a IEEE802.16 method, and the time point information is included in a DL-MAP (Down Link Map).

(Additional Statement 15)

The wireless base station according to the additional statement 14, wherein the time point information is included in a Broadcast Control Pointer message in the DL-MAP.

(Additional Statement 16)

A communication method in a wireless communication system provided with a wireless terminal, a first wireless base station which belongs to a first base station group, and a second wireless base station which belongs to a second base station group, the communication method including:

transmitting time point information from the second wireless base station, the time point information indicating a time point at which service information is transmitted from the second wireless base station, the service information indicating a service provided via the second wireless base station;

transmitting the service information from the second wireless base station;

obtaining the time point information by using the wireless terminal in a first non-communication period in which communication between the wireless terminal and the first wireless base station is temporarily stopped; and obtaining the service information by using the wireless terminal in a second non-communication period which is ensured in accordance with the time point indicated by the time point information and in which the communication between the wireless terminal and the first wireless base station is temporarily stopped.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless terminal comprising:
    a first obtaining device obtaining time point information from a second wireless base station in a first non-communication period in which communication with a first wireless base station which belongs to a first NAP (Network Access Provider) is temporarily stopped, the time point information indicating a time point at which service information is transmitted from the second wireless base station, the service information indicating a service provided via the second wireless base station which belongs to a second NAP (Network Access Provider) which is different from the first NAP;
    a second obtaining device obtaining the service information from the second wireless base station in a second non-communication period which is ensured in accordance with the time point indicated by the time point information and in which the communication with the first wireless base station is temporarily stopped; and
    a requesting device requesting the second non-communication period of the first wireless base station in accordance with the time point indicated by the time point information.

2. The wireless terminal according to claim 1, wherein transmission frequency of the time point information is higher than transmission frequency of the service information.

3. The wireless terminal according to claim 1, wherein the requesting device requesting the first non-communication period of the first wireless base station.

4. The wireless terminal according to claim 3, wherein the requesting device requests at least one of the first non-communication period and the second non-communication period for the first wireless base station, by using a scan request command for requesting a period in which a communication environment between the wireless terminal and another first wireless base station, which is adjacent to the first wireless base station with which the wireless terminal currently performs the communication, is measured.

5. The wireless terminal according to claim 3, wherein the requesting device requests at least one of the first non-communication period and the second non-communication period, by using an intermittent communication request command for requesting temporary stop of the communication with the first wireless base station with which the wireless terminal currently performs the communication.

6. The wireless terminal according to claim 1, wherein
    the wireless terminal performs communication with each of the first wireless base station and the second wireless base station in accordance with a IEEE802.16 method, and
    the time point information is included in a DL-MAP (Down Link MAP).

7. The wireless terminal according to claim 6, wherein the time point information is included in a Broadcast Control Pointer message in the DL-MAP.

8. The wireless terminal according to claim 1, wherein the first obtaining device obtains the time point information if another first wireless base station that allows handover from the first wireless base station with which the wireless terminal currently performs the communication does not exist in the first NAP.

9. The wireless terminal according to claim 1, wherein the second obtaining device obtains the service information if another first wireless base station that allows handover from the first wireless base station with which the wireless terminal currently performs the communication does not exist in the first base station NAP.

10. The wireless terminal according to claim 1, wherein the second obtaining device obtains the service information in the first non-communication period if the time point indicated by the time information is included in the first non-communication period.

11. A wireless base station which belongs to one NAP (Network Access Provider) comprising:
    a first transmitting device transmitting, to a wireless terminal which temporarily stops a communication with another wireless base station which belongs to another NAP (Network Access Provider) which is different from the one NAP, time point information indicating a time point at which service information is transmitted, the service information indicating a service provided via the wireless base station; and
    a second transmitting device transmitting, to the wireless terminal which requests the another wireless base station to stop the communication with the wireless terminal in accordance with the time point indicated by the time point information and which temporarily stops the communication with the another wireless base station in accordance with the time point indicated by the time point information, the service information.

12. The wireless base station according to claim 11, wherein transmission frequency of the time point information is higher than transmission frequency of the service information.

13. The wireless base station according to claim 11, wherein
    the wireless base station performs communication in accordance with a IEEE802.16 method, and
    the time point information is included in a DL-MAP (Down Link Map).

14. A communication method in a wireless communication system comprising a wireless terminal, a first wireless base station which belongs to a first NAP (Network Access Provider), and a second wireless base station which belongs to a second NAP (Network Access Provider) which is different from the first NAP,
    the communication method comprising:
    transmitting time point information from the second wireless base station, the time point information indicating a time point at which service information is transmitted from the second wireless base station, the service information indicating a service provided via the second wireless base station;

transmitting the service information from the second wireless base station;

obtaining the time point information by using the wireless terminal in a first non-communication period in which communication between the wireless terminal and the first wireless base station is temporarily stopped;

a second obtaining process of obtaining the service information by using the wireless terminal in a second non-communication period which is ensured in accordance with the time point indicated by the time point information and in which the communication between the wireless terminal and the first wireless base station is temporarily stopped; and a requesting process of requesting the second non-communication period of the first wireless base station in accordance with the time point indicated by the time point information.

* * * * *